United States Patent
Mizutaki et al.

(10) Patent No.: US 11,787,963 B2
(45) Date of Patent: *Oct. 17, 2023

(54) AQUEOUS INK JET INK COMPOSITION AND INK JET RECORDING METHOD

(71) Applicant: Seiko Epson Corporation, Toyko (JP)

(72) Inventors: Yusuke Mizutaki, Shiojiri (JP); Mitsuaki Kosaka, Minowa (JP)

(73) Assignee: SEIKO EPSON CORPORATION

(*) Notice: Subject to any disclaimer, the term of this patent is extended or adjusted under 35 U.S.C. 154(b) by 94 days.

This patent is subject to a terminal disclaimer.

(21) Appl. No.: 17/154,034

(22) Filed: Jan. 21, 2021

(65) Prior Publication Data

US 2021/0222019 A1 Jul. 22, 2021

(30) Foreign Application Priority Data

Jan. 22, 2020 (JP) .................. 2020-008188

(51) Int. Cl.
*C09D 11/326* (2014.01)
*B41M 5/00* (2006.01)
(Continued)

(52) U.S. Cl.
CPC .............. *C09D 11/326* (2013.01); *B41J 2/14* (2013.01); *B41J 2/2107* (2013.01); *B41M 5/00* (2013.01);
(Continued)

(58) Field of Classification Search
CPC ... C09D 11/326; C09D 11/033; C09D 11/324; C09D 11/38; C09D 11/36; C09D 11/322;
(Continued)

(56) References Cited

U.S. PATENT DOCUMENTS 9,708,500 B2 7/2017 Ito
10,752,796 B2 8/2020 Seguchi et al.
(Continued)

FOREIGN PATENT DOCUMENTS

CN 107880649 A 4/2018
JP H11-181340 A 7/1999
(Continued)

*Primary Examiner* — Manish S Shah
(74) *Attorney, Agent, or Firm* — Harness, Dickey & Pierce, P.L.C.

(57) ABSTRACT

An aqueous ink jet ink composition according to the present embodiment is an aqueous ink jet ink composition for use in an ink jet recording method that includes ejecting ink from an ink jet head. The ink jet head includes nozzles that have a side wall surface, and the side wall surface has a scalloped shape in which a scallop width S1 and a notch depth S2 satisfy S1/S2≥4. The aqueous ink jet ink composition includes a self-dispersed pigment and a solvent that includes a compound represented by formula (1) below.

$$R_1\text{—O—}R_2\text{—OH} \quad (1)$$

In formula (1), $R_1$ represents a hydrogen atom, a methyl group, or an ethyl group, and $R_2$ represents a divalent saturated hydrocarbon group having 5 or fewer carbon atoms or represents a group represented by formula (2) below.

$$R_3\text{—O—}R_4 \quad (2)$$

In formula (2), $R_3$ and $R_4$ each independently represent a divalent saturated hydrocarbon group having 2 or 3 carbon atoms.

15 Claims, 2 Drawing Sheets

(51) Int. Cl.
*B41J 2/14* (2006.01)
*C09D 11/033* (2014.01)
*B41J 2/21* (2006.01)
*C09D 11/38* (2014.01)
*C09D 11/324* (2014.01)
*C09D 11/322* (2014.01)

(52) U.S. Cl.
CPC ......... *B41M 5/0023* (2013.01); *C09D 11/033* (2013.01); *C09D 11/322* (2013.01); *C09D 11/324* (2013.01); *C09D 11/38* (2013.01); *B41J 2202/01* (2013.01)

(58) Field of Classification Search
CPC ......... C09D 11/40; C09D 11/30; C09D 11/32; C09D 11/328; C09D 11/101; C09D 11/102; C09D 11/005; C09D 11/54; C09D 11/52; C09D 11/106; B41J 2/14; B41J 2202/01; B41J 25/001; B41J 25/34; B41J 25/003; B41J 2/21; B41J 25/312; B41J 2025/008; B41J 2202/21; B41J 2/17596; B41J 2/16508; B41J 2/1652; B41J 2/16538; B41J 2/175; B41J 2/17563; B41J 2/1433; B41J 2/1623; B41J 2202/00; B41J 2202/03; B41J 2/14201; B41J 2/045; B41J 11/0015; B41J 11/002; B41J 2/04581; B41J 2/055; B41J 2002/16502; B41J 2/04588; B41J 2/04595; B41J 2/04586; B41J 2/14274; B41J 2/01; B41J 2/211; B41J 2/17; B41J 2/17593; B41J 2/2107; B41J 2/1755; B41J 2/2114; B41J 2/2117; B41J 2/2056; B41J 2/0057; B41J 3/60; B41J 2002/012; B41J 2/04598; B41M 5/0023; B41M 5/00; B41M 5/0011; B41M 5/0017; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | |
|---|---|---|---|
| 10,787,585 | B2 | 9/2020 | Ito |
| 2003/0079647 | A1 | 5/2003 | Kaneko et al. |
| 2006/0098050 | A1* | 5/2006 | Terui ................ B41J 2/1626 347/61 |
| 2007/0003715 | A1* | 1/2007 | Tsubaki ............. B41M 5/52 106/31.27 |
| 2007/0281474 | A1* | 12/2007 | Suzuki ........... H01L 21/76898 257/E21.585 |
| 2010/0165019 | A1* | 7/2010 | Koike ............... B41M 5/0023 347/100 |
| 2011/0187770 | A1* | 8/2011 | Aoyama ............. C09D 11/38 347/100 |
| 2017/0246893 | A1* | 8/2017 | Muto ................. B41J 29/38 |
| 2017/0369723 | A1* | 12/2017 | Mizutaki ............. B41J 2/04 |
| 2018/0086067 | A1* | 3/2018 | Mizutani ........... B41J 2/14088 |
| 2018/0298214 | A1 | 10/2018 | Takahashi et al. |

FOREIGN PATENT DOCUMENTS

| | | |
|---|---|---|
| JP | 2002-179958 A | 6/2002 |
| JP | 2002-338864 A | 11/2002 |
| JP | 2003-026965 A | 1/2003 |
| JP | 2005-097433 A | 4/2005 |
| JP | 2005-264080 A | 9/2005 |
| JP | 2006-130868 A | 5/2006 |
| JP | 2008-150507 A | 7/2008 |
| JP | 2011-162687 A | 8/2011 |
| JP | 2018-002778 A | 1/2018 |
| JP | 2018-051955 A | 4/2018 |
| JP | 2018-127521 A | 8/2018 |
| JP | 2018-177943 A | 11/2018 |
| WO | 2008-075715 A1 | 6/2008 |

* cited by examiner

AQUEOUS INK JET INK COMPOSITION AND INK JET RECORDING METHOD

The present application is based on, and claims priority from JP Application Serial Number 2020-008188, filed Jan. 22, 2020, the disclosure of which is hereby incorporated by reference herein in its entirety.

BACKGROUND

1. Technical Field

The present disclosure relates to an aqueous ink jet ink composition and an ink jet recording method.

2. Related Art

A typical ink jet recording apparatus includes an ejection head including nozzles for ejecting ink, a driving unit for causing ink to be ejected from the nozzles, and a control unit for controlling the driving unit in accordance with data. The nozzles of the ejection head are formed by dry-etching a silicon substrate to realize a high array density and an increase in the number of nozzles. It is known that a shape of a side wall surface of the nozzles formed in such a manner is a corrugated shape called a "scalloped shape", which is similar to the shape seen on the surface of the shell of a scallop.

JP-A-2018-002778 discloses a water-based ink composition for use in an ink jet recording apparatus provided with an ink jet head that includes nozzles having a side wall surface, which has a scalloped shape. According to the disclosure of JP-A-2018-002778, the water-based ink composition has a viscosity at 20° C., a yield value at 20° C., and a yield value at 20° C. when 25% of water is evaporated, each of which is within a specified range, and thus the water-based ink composition has excellent continuous printing stability even in high-temperature environments (hereinafter, the "printing stability" may also be referred to simply as "printability").

However, regarding water-based ink compositions such as that described in JP-A-2018-002778 that are used in an ink jet recording apparatus provided with an ink jet head that includes nozzles having a side wall surface that has a scalloped shape, inks including a self-dispersed pigment have not exhibited sufficient ejection reliability in the past.

SUMMARY

The present inventors diligently performed studies to solve the problem described above. As a result, the present inventors discovered that the problem described above can be solved by an aqueous ink jet ink composition including a self-dispersed pigment and including a solvent that includes a specific compound.

An aqueous ink jet ink composition according to the present disclosure is an aqueous ink jet ink composition for use in an ink jet recording method that includes ejecting ink from an ink jet head. The ink jet head includes nozzles that have a side wall surface, and the side wall surface has a scalloped shape in which a scallop width S1 and a notch depth S2 satisfy S1/S2≥4. The aqueous ink jet ink composition includes a self-dispersed pigment and a solvent that includes a compound represented by formula (1) below.

$$R_1\text{—}O\text{—}R_2\text{—}OH \tag{1}$$

In formula (1), $R_1$ represents a hydrogen atom, a methyl group, or an ethyl group, and $R_2$ represents a divalent saturated hydrocarbon group having 5 or fewer carbon atoms or represents a group represented by formula (2) below.

$$R_3\text{—}O\text{—}R_4 \tag{2}$$

In formula (2), $R_3$ and $R_4$ each independently represent a divalent saturated hydrocarbon group having 2 or 3 carbon atoms.

An ink jet recording method according to the present disclosure includes an ejection step of ejecting an aqueous ink jet ink composition according to the present disclosure from an ink jet head, the ink jet head including nozzles that have a side wall surface, the side wall surface having a scalloped shape in which a scallop width S1 and a notch depth S2 satisfy S1/S2≥4.

DESCRIPTION OF EXEMPLARY EMBODIMENTS

Figure 1:
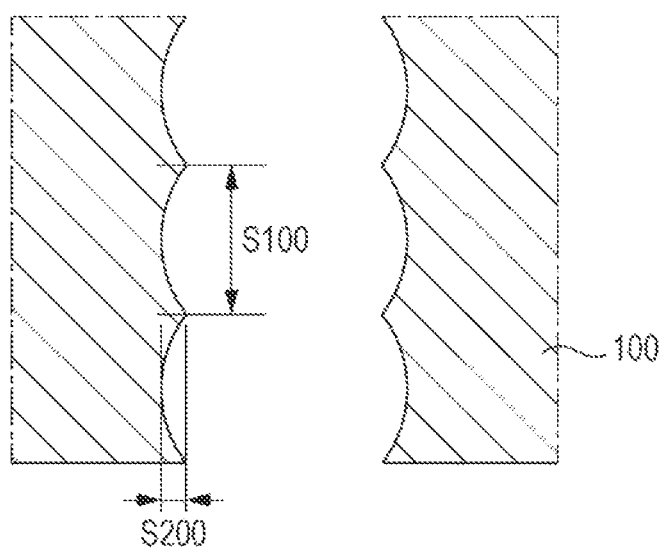
FIG. 1 is a cross-sectional view illustrating, in detail, a shape of a portion of a nozzle.

An embodiment of the present disclosure (hereinafter referred to as the "present embodiment") will be described in detail below. However, the present disclosure is not limited to the present embodiment, and various modifications may be made thereto without departing from the scope of the disclosure.

In this specification, the term "ejection reliability" refers to a property of having excellent intermittent printability and room-temperature and high-temperature continuous printability. In this specification, the term "intermittent printability" refers to a property of ensuring stable ejection even when the time interval from the time at which ejection is stopped to the time at which the next ejection is performed is long. In this specification, the term "room-temperature continuous printability" refers to a property of ensuring stable ejection even when printing is performed continuously at room temperature, for example, a property of ensuring stable ejection even when printing is performed continuously for 7 to 9 hours at approximately 25° C. In this specification, the term "high-temperature continuous printability" refers to a property of ensuring stable ejection even when printing is performed continuously at a relatively high temperature. For example, the property is a property of ensuring stable ejection even when printing is performed continuously for 7 to 9 hours at a high temperature of 30 to 50° C.

Aqueous Ink Jet Ink Composition

An aqueous ink jet ink composition of the present embodiment is for use in an ink jet recording apparatus that performs recording by ejecting ink from an ink jet head. The ink jet head includes nozzles that have a side wall surface, the side wall surface having a scalloped shape in which a scallop width S1 and a notch depth S2 satisfy a relationship of S1/S2≥4. The aqueous ink jet ink composition includes a self-dispersed pigment and a solvent that includes a compound represented by formula (1) below. Hereinafter, the aqueous ink jet ink composition is also referred to simply as an "aqueous ink" or an "ink composition".

$$R_1—O—R_2—OH \quad (1)$$

In formula (1), $R_1$ represents a hydrogen atom, a methyl group, or an ethyl group, and $R_2$ represents a divalent saturated hydrocarbon group having 5 or fewer carbon atoms or represents a group represented by formula (2) below.

$$R_3—O—R_4 \quad (2)$$

In formula (2), $R_3$ and $R_4$ each independently represent a divalent saturated hydrocarbon group having 2 or 3 carbon atoms.

The nozzles of the ejection head have a side wall surface that has a scalloped shape so as to realize a high array density and an increase in the number of nozzles. In the case in which the side wall surface has such a shape, a problem arises in that when pigment-containing aqueous ink is ejected, alignment degradation, that is, a so-called position displacement, tends to occur. Furthermore, in the case in which the side wall surface has a scalloped shape, because of the large surface area of the interiors of the nozzles, the aqueous ink dries in the interiors of the nozzles when the aqueous ink is ejected and the meniscus is drawn in, and the solids, which primarily include the pigment, adhere and accumulate in the interiors of the nozzles. As a result, a deviation in the ejection direction occurs, and/or a failure to eject the aqueous ink occurs. The present inventors diligently performed studies to address these problems. As a result, the present inventors discovered that using a self-dispersed pigment (self-dispersible pigment) as a pigment and using an ether group- and hydroxyl group-containing compound having a relatively low molecular weight as a solvent reduce the occurrence of a deviation in the ejection direction and inhibit misfiring of the aqueous ink. One possible reason for this is that such a solvent coats the pigment, thereby enhancing the dispersion stability of the pigment and inhibiting thickening of the ink due to the drying of the ink. If ink dries on the scalloped inner surface of nozzles, a self-dispersed pigment, in particular, tends not to be redispersed easily in a case in which the pigment solidifies. However, in the present embodiment, it is speculated that the solvent described above inhibits the drying of the ink by coating the self-dispersed pigment and thus serves to enhance the redispersibility of the pigment. That is, the solvent including a compound represented by formula (1) is an excellent humectant for self-dispersed pigments. However, this may not be the only reason. The ink jet ink composition is an ink composition that is used for recording by being ejected from an ink jet head. The aqueous ink is an ink including at least water as a principal solvent component of the ink.

Self-Dispersed Pigment

The ink composition includes a self-dispersed pigment. The self-dispersed pigment is a surface-modified pigment in which a functional group is directly or indirectly bound to the surface. The functional group is at least one selected from the group consisting of carbonyl groups, carboxyl groups, aldehyde groups, hydroxyl groups, sulfone groups, ammonium groups, and salts of any of the foregoing compounds. Compared with other coloring materials, a self-dispersed pigment easily forms aggregates on a recording medium and, therefore, can increase an optical density of a printed area. In particular, in a case in which plain paper (for business documents) is used, a high black density is desired, and, therefore, in terms of increasing a black density, a carbon black self-dispersed pigment is particularly necessary. Furthermore, self-dispersed pigments have high dispersion stability, and, therefore, a suitable viscosity can be achieved without the need to use a dispersant, such as a resin, to disperse the pigment. Accordingly, in a case in which a self-dispersed pigment is used, the ink composition can be easily handled even when a content of the self-dispersed pigment is increased, and, consequently, an image in which excellent color development is exhibited can be formed. In contrast, in a case in which a pigment other than a self-dispersed pigment is used, a dispersant is necessary, which causes problems in that, for example, the dispersant increases the viscosity of the ink, and, consequently, ejection stability is compromised. Accordingly, in such inks, a content of the coloring material is not to be increased, which is disadvantageous in terms of achieving a high ink density. Hence, self-dispersed pigments are useful in that the need to use a dispersant is eliminated, and, consequently, the ink has a relatively low viscosity. In particular, self-dispersed pigments are useful in that even when high-density printing is desired to be performed, and a relatively high concentration of the pigment in the ink is desired, the viscosity of the ink can be kept at a low level. On the other hand, once aggregates of a self-dispersed pigment are formed, which may occur, for example, when the ink dries, the self-dispersed pigment tends to have reduced dispersion stability and, therefore, tends not to be redispersed easily, compared with a pigment that is dispersed with a dispersant such as a resin. In particular, this tendency is prominent in self-dispersed pigments in which an amount of functional groups introduced into the pigment surface is limited to a specific amount or less. In the ink composition of the present embodiment, a self-dispersed pigment is used as a pigment, and, moreover, a specific compound is used in a solvent, and, consequently, the ink composition inhibits misfiring of aqueous inks.

Examples of the self-dispersed pigment include organic pigments and inorganic pigments. Examples of the organic pigments include carbon black, azo lakes, insoluble azo pigments, condensed azo pigments, chelate azo pigments, phthalocyanine pigments, perylene pigments, perinone pigments, quinacridone pigments, thioindigo pigments, isoindolinone pigments, quinophthalone pigments, dioxazine pigments, anthraquinone pigments, nitro pigments, nitroso pigments, and aniline black. Examples of the inorganic pigments include titanium white, zinc white, white lead, carbon black-based pigments, red iron oxide, vermillion, cadmium red, chrome yellow, ultramarine blue, cobalt blue, cobalt violet, and zinc chromate.

It is preferable that the self-dispersed pigment be carbon black because carbon black, among others, enables printing of a high-density black color image and has higher ejection reliability.

The self-dispersed pigment may be a preparation prepared by a known method or a commercially available product. Examples of the commercially available product include Microjet CW-1 and Microjet CW-2, manufactured by Orient Chemical Industries Co., Ltd., and Cab-O-Jet 200 and Cab-O-Jet 300, manufactured by Cabot Corporation.

It is preferable that a specific surface area of the self-dispersed pigment, as measured by pulsed NMR, be less than or equal to 60 $m^2/g$, from the standpoint of achieving better color development. More preferably, the specific surface area is less than or equal to 25 $m^2/g$, even more preferably less than or equal to 22 $m^2/g$, still more preferably less than or equal to 18 $m^2/g$, and particularly preferably less than or equal to 15 $m^2/g$. On the other hand, from the standpoint of achieving better non-settling characteristics, it is preferable that the surface area of the self-dispersed pigment as measured by pulsed NMR be greater than or equal to 3 m$^2$/g. More preferably, the specific surface area is greater than or equal to 5 m$^2$/g, even more preferably greater than or equal to 6 m$^2$/g, and particularly preferably greater than or equal to 7 m$^2$/g. The specific surface area of the self-dispersed pigment can be determined by using the method described in the Examples section provided herein. Methods for adjusting the specific surface area of the self-dispersed pigment include the following: adjusting a concentration, an amount of addition, and/or the like of the surface treatment agent that is used in the surface treatment of the self-dispersed pigment; adjusting the surface treatment conditions (e.g., a treatment temperature and the like); and appropriately replacing the surface treatment agent, for example, with a different type of surface treatment agent. Typically, the specific surface area tends to be high when the amount of functional groups introduced into the pigment surface is large. In a case in which the specific surface area of the self-dispersed pigment is high, the dispersion stability of the pigment is increased, and, in this regard, such a case is preferable. On the other hand, in a case in which the specific surface area is low, the time and the materials that are necessary for the surface treatment of the self-dispersed pigment are reduced, and, in this regard, such a case is preferable. Furthermore, in a case in which the specific surface area is high, the pigment is easily absorbed into a recording medium when the pigment has a high affinity for the recording medium, and the recording medium is an absorbent recording medium; as a result, the pigment may exhibit degraded color development. On the other hand, in a case in which the specific surface area of the pigment is low, the pigment exhibits excellent color development, and, in this regard, such a case is preferable. Note that the specific surface area of the self-dispersed pigment tends to be higher in a case in which a volume average particle diameter of the pigment is smaller than in other cases, provided that the amount of functional groups introduced into the pigment surface per unit area is equal between the cases.

It is preferable that the volume average particle diameter of the self-dispersed pigment be less than or equal to 150 nm. On the other hand, it is preferable that the volume average particle diameter of the self-dispersed pigment be greater than or equal to 50 nm. In this specification, the volume average particle diameter may also be referred to simply as an average particle diameter. When the volume average particle diameter of the self-dispersed pigment is greater than or equal to the value mentioned above, the aqueous ink tends to have higher ejection reliability and color development. From a similar standpoint, it is more preferable that the volume average particle diameter of the self-dispersed pigment be greater than or equal to 80 nm. Even more preferably, the volume average particle diameter is greater than or equal to 90 nm, still more preferably greater than or equal to 100 nm, and particularly preferably greater than or equal to 110 nm. When the volume average particle diameter of the pigment is less than or equal to 150 nm, the aqueous ink tends to have better pigment non-settling characteristics. From a similar standpoint, it is more preferable that the volume average particle diameter of the self-dispersed pigment be less than or equal to 140 nm. Even more preferably, the volume average particle diameter is less than or equal to 130 nm, and still more preferably less than or equal to 110 nm. The volume average particle diameter of the self-dispersed pigment is a D50 value, measured by dynamic light scattering. The volume average particle diameter may be measured, for example, by using a Nanotrac-series particle diameter distribution analyzer, manufactured by MicrotracBEL Corporation. Specifically, the method described in the Examples section provided herein can be used to determine the volume average particle diameter. Examples of methods for adjusting the volume average particle diameter of the self-dispersed pigment include the following: a method in which the degree of pulverization of the self-dispersed pigment, before being dispersed, is adjusted, a method in which the stirring conditions (e.g., a stirring speed, a stirring temperature, and the like) employed for dispersion are adjusted, and a method in which, after the dispersion of the pigment, adjustment is carried out by performing filtration using a filter.

It is preferable that a content of the self-dispersed pigment be 4.0 mass % or greater and 8.0 mass % or less relative to a total mass of the aqueous ink. When the content of the self-dispersed pigment is greater than or equal to 4 mass %, the aqueous ink tends to exhibit better color development. From a similar standpoint, it is more preferable that the content of the self-dispersed pigment be greater than or equal to 4.5 mass %. Even more preferably, the content is greater than or equal to 5.0 mass %. When the content of the self-dispersed pigment is less than or equal to 8 mass %, the aqueous ink tends to exhibit higher ejection reliability. From a similar standpoint, it is more preferable that the content of the self-dispersed pigment be less than or equal to 7.0 mass %. Even more preferably, the content is less than or equal to 6.0 mass %.

Solvent

The solvent includes a compound represented by formula (1) below. Since the solvent includes the specific compound, the aqueous ink has excellent ejection reliability. The compound represented by formula (1) is a type of solvent, or specifically, an organic solvent. Hereinafter, the compound represented by formula (1) below may also be referred to simply as a "specific compound".

$$R_1-O-R_2-OH \quad (1)$$

In formula (1), $R_1$ represents a hydrogen atom, a methyl group, or an ethyl group. $R_2$ represents a divalent saturated hydrocarbon group having 5 or fewer carbon atoms or represents a group represented by formula (2) below.

$$R_3-O-R_4 \quad (2)$$

In formula (2), $R_3$ and $R_4$ each independently represent a divalent saturated hydrocarbon group having 2 or 3 carbon atoms. Note that when $R_2$ is a group represented by formula (2), formula (1) can be expressed as follows.

$$R_1-O-R_3-O-R_4-OH \quad (1)$$

With regard to formula (1), it is preferable that $R_1$ be a hydrogen atom, from the standpoint of achieving better room-temperature continuous ejection stability, intermittent ejection stability, non-settling characteristics, and color development.

Examples of the divalent saturated hydrocarbon group having 5 or fewer carbon atoms include linear alkanediyl groups, branched alkanediyl groups, and divalent alicyclic saturated hydrocarbon groups. It is preferable that the divalent saturated hydrocarbon group having 5 or fewer carbon atoms be a linear alkanediyl group or a branched alkanediyl group, from the standpoint of providing effects and advantages of the present disclosure more effectively and reliably.

Examples of the linear alkanediyl group include a methylene group, a 1,2-ethylene group, a 1,3-propylene group (trimethylene group), a 1,4-butylene group (tetramethylene group), and a 1,5-pentylene group (pentamethylene group). Examples of the branched alkanediyl group include a 1,1-ethylene group, a 1,1-propylene group, a 1,2-propylene group, a 2,2-propylene group, a 1,4-pentylene group, a 2,4-pentylene group, a 2-methylpropane-1,3-diyl group, a 2-methylpropane-1,2-diyl group, and a 2-methylbutane-1,4-diyl group.

It is preferable that the divalent saturated hydrocarbon group having 5 or fewer carbon atoms be a divalent saturated hydrocarbon group having from 2 to 4 carbon atoms, from the standpoint of achieving higher ejection reliability. More preferably, the divalent saturated hydrocarbon group is a divalent saturated hydrocarbon group having 2 or 3 carbon atoms.

With regard to formula (2), examples of the divalent saturated hydrocarbon group having 2 or 3 carbon atoms include linear alkanediyl groups having 2 or 3 carbon atoms and branched alkanediyl groups having 2 or 3 carbon atoms. Examples of the linear alkanediyl group having 2 or 3 carbon atoms include a 1,2-ethylene group and a 1,3-propylene group. Examples of the branched alkanediyl group having 2 or 3 carbon atoms include a 1,1-ethylene group, a 1,1-propylene group, a 1,2-propylene group, and a 2,2-propylene group.

With regard to formula (2), it is preferable that $R_3$ and $R_4$ be each an ethylene group or a propylene group, from the standpoint of achieving higher ejection reliability. More preferably, $R_3$ and $R_4$ are each a propylene group, and even more preferably a 1,2-propylene group.

It is preferable that the specific compound be one of the following: with regard to formula (1), (i) a compound in which $R_1$ is a hydrogen atom, a methyl group, or an ethyl group, and $R_2$ is a divalent saturated hydrocarbon group having 5 or fewer carbon atoms; and (ii) a compound in which $R_1$ is a hydrogen atom, and $R_2$ is a group represented by formula (2). When the specific compound is such a compound, the aqueous ink tends to have higher ejection reliability.

It is preferable that the specific compound be one of the following: with regard to formula (1), (iii) a compound in which $R_1$ is a hydrogen atom or a methyl group, and $R_2$ is a divalent saturated hydrocarbon group having 3 or fewer carbon atoms; and (iv) a compound in which $R_1$ is a hydrogen atom, $R_2$ is a group represented by formula (2), and $R_3$ and $R_4$ are each an ethylene group or each a propylene group. When the specific compound is such a compound, the aqueous ink tends to have better high-temperature continuous printability.

It is preferable that a molecular weight of the specific compound be 50 or greater and 150 or less, from the standpoint of achieving higher ejection reliability, non-settling characteristics, and image quality. More preferably, the molecular weight is 50 or greater and 135 or less, even more preferably 50 or greater and 130 or less, still more preferably 50 or greater and 115 or less, and even further preferably 60 or greater and 110 or less.

Representative examples of the specific compound include ethylene glycol, propylene glycol, 1,4-butanediol, 1,5-pentanediol, ethylene glycol monomethyl ether, propylene glycol monomethyl ether, 1-methoxy butanol, ethylene glycol monoethyl ether, propylene glycol monoethyl ether, diethylene glycol, diethylene glycol monomethyl ether, diethylene glycol monoethyl ether, dipropylene glycol, and dipropylene glycol monomethyl ether.

In particular, it is preferable that the specific compound be at least one selected from the group consisting of ethylene glycol, diethylene glycol, propylene glycol, dipropylene glycol, propylene glycol monomethyl ether, and ethylene glycol monomethyl ether. When the specific compound is such a compound, better room-temperature continuous ejection stability, intermittent ejection stability, non-settling characteristics, and color development tend to be achieved collectively in the aqueous ink.

It is preferable that a content of the specific compound be 2 mass % or greater and 16 mass % or less relative to the total mass of the aqueous ink. When the content of the specific compound is greater than or equal to 2 mass %, the aqueous ink tends to have better intermittent ejection stability and high-temperature continuous ejection stability. From a similar standpoint, it is more preferable that the content of the specific compound be greater than or equal to 5 mass % relative to the total mass of the aqueous ink; even more preferably, the content is greater than or equal to 7 mass %. When the content of the specific compound is less than or equal to 16 mass %, the aqueous ink tends to have better ink storage stability. Furthermore, in a case in which an excessively high content of the specific compound is avoided, a low viscosity of the ink can be ensured. Accordingly, such a case is preferable. From a similar standpoint, it is more preferable that the content of the specific compound be less than or equal to 13 mass % relative to the total mass of the aqueous ink; even more preferably, the content is less than or equal to 12 mass %.

Monoalcohol

It is preferable that the solvent further include a monoalcohol. When the solvent includes a monoalcohol, the solvent exhibits excellent permeability with respect to the surface of the self-dispersed pigment, and, consequently, bubbles are inhibited from remaining on the surface of the self-dispersed pigment. Furthermore, when the solvent includes a monoalcohol, the ink has increased wettability with respect to the recesses of the scalloped shape, which is a shape of a side wall surface of the nozzles, and, consequently, bubbles are inhibited from remaining in the recesses. Hence, when the solvent includes a monoalcohol, bubbles are inhibited from remaining on the surface of the self-dispersed pigment, and, consequently, degradation of ejection stability that may be caused if the remaining bubbles appear in the ink is prevented. Furthermore, similarly, since bubbles are speculated to be inhibited from remaining in the recesses of the scalloped shape, ejection failure is inhibited from occurring, particularly at room temperature. However, this may not be the only reason.

As used herein, the term "monoalcohol" is a general term that refers to compounds in which one hydrogen atom in an alkane is replaced with a hydroxyl group. The alkane is preferably an alkane having 10 or fewer carbon atoms, more preferably an alkane having 6 or fewer carbon atoms, and even more preferably an alkane having 3 or fewer carbon atoms. The alkane has at least one carbon atom and preferably has two or more carbon atoms. The alkane may be linear or branched. Examples of the monoalcohol include methanol, ethanol, n-propyl alcohol, isopropyl alcohol, n-butanol, 2-butanol, tert-butanol, isobutanol, n-pentanol, 2-pentanol, 3-pentanol, and tert-pentanol.

A content of the monoalcohol is preferably 0.5 mass % or greater and 10 mass % or less and more preferably 1 mass % or greater and 6 mass % or less, relative to the total mass of the ink composition. When the content of the monoalcohol is greater than or equal to the lower limit mentioned above, the ink composition tends to have better room-temperature continuous ejection stability. From a similar standpoint, it is more preferable that the content of the monoalcohol is greater than or equal to 2 mass %. Even more preferably, the content is greater than or equal to 3 mass %. When the content of the monoalcohol is less than or equal to the upper limit mentioned above, an excessively high content of organic solvents in the ink can be avoided, and, consequently, a low viscosity of the ink can be ensured, and excellent ink storage stability is achieved. Accordingly, such a content of the monoalcohol is preferable. From a similar standpoint, it is more preferable that the content of the monoalcohol be less than or equal to 5 mass %. Even more preferably, the content is less than or equal to 4 mass %.

It is preferable that the solvent include a pyrrolidone-based solvent. When the solvent includes a pyrrolidone-based solvent, the aqueous ink tends to have better high-temperature continuous printability and abrasion resistance.

Examples of the pyrrolidone-based solvent include 2-pyrrolidone, N-alkyl-2-pyrrolidone, and 1-alkyl-2-pyrrolidone. It is preferable that the pyrrolidone-based solvent be 2-pyrrolidone, from the standpoint of providing effects and advantages of the present disclosure more effectively and reliably.

In a case in which a pyrrolidone-based solvent is included, a content of the pyrrolidone-based solvent is preferably 0.5 mass % or greater and 10 mass % or less, more preferably 0.7 mass % or greater and 7 mass % or less, even more preferably 1 mass % or greater and 5 mass % or less, and particularly preferably 1 mass % or greater and 2 mass % or less, relative to the total mass of the aqueous ink.

The solvent may further include one or more other solvents, in addition to the specific compound, the monoalcohol, and the pyrrolidone-based solvent. Examples of the one or more other solvents include polyols and glycol ethers. Examples of the polyols include alkane polyols having three or more hydroxyl groups, alkanediols, and products produced by condensation between hydroxyl groups of alkanediols. Examples of the glycol ethers include monoethers and diethers produced by etherification of the above-mentioned alkanediols. It is to be noted that the one or more other solvents are solvents different from the specific compound described above. The one or more other solvents are preferably polyols and more preferably alkanediols. With the use of such a compound, the ink composition tends to have higher abrasion resistance.

Examples of the one or more other solvents include triethylene glycol, tetraethylene glycol, polyethylene glycol, 1,3-propanediol, tripropylene glycol, polypropylene glycol, poly(tetramethylene) glycol, hexamethylene glycol, tetraethylene glycol, neopentyl glycol, 1,2-butanediol, 1,3-butanediol, 1,4-butanediol, 1,2-pentanediol, 1,5-pentanediol, 1,6-hexanediol, 3-methyl-1,5-pentanediol, 1,2-cyclohexanediol, 1,4-cyclohexanediol, 1,4-cyclohexanedimethanol, 4,4-dihydroxyphenylpropane, 4,4-dihydroxyphenylmethane, glycerol, trimethylolethane, trimethylolpropane, 1,2,5-hexanetriol, 1,2,6-hexanetriol, pentaerythritol, trimethylol melamine, polyoxypropylene triol, dimethyl-1,3-pentanediol, diethyl-1,3-pentanediol, dipropyl-1,3-pentanediol, dibutyl-1,3-pentanediol, and 2-butyl-2-ethyl-1,3-propanediol. One of these is used alone or two or more of these are used in combination.

A content of the one or more other solvents is preferably 1 mass % or greater and 25 mass % or less, more preferably 2 mass % or greater and 20 mass % or less, and even more preferably 5 mass % or greater and 15 mass % or less, relative to the total mass of the aqueous ink.

In addition, it is preferable that the aqueous ink include glycerol as the one or more other solvents. A content of the glycerol is preferably less than or equal to 20.0 mass %, more preferably less than or equal to 13.0 mass %, and even more preferably less than or equal to 11.0 mass %, relative to the total mass of the aqueous ink. When the content of the glycerol is within any of the above-mentioned ranges, the aqueous ink tends to have better intermittent printability and abrasion resistance. From a similar standpoint, it is preferable that the content of the glycerol is less than or equal to 10.0 mass %, relative to the total mass of the aqueous ink; more preferably, the content is less than or equal to 9.5 mass %, and even more preferably, less than or equal to 9.0 mass %. Furthermore, the content of the glycerol is preferably greater than or equal to 3 mass %, more preferably greater than or equal to 5 mass %, and even more preferably greater than or equal to 7 mass %, relative to the total mass of the aqueous ink. In these cases, higher ejection reliability and the like can be achieved, and, accordingly, these cases are preferable. Glycerol has a relatively high normal boiling point and provides excellent moisture retention for the ink. On the other hand, since glycerol has a high viscosity, when the aqueous ink dries on the scallop of the side wall of the nozzles, the aqueous ink tends to have increased viscosity. It is speculated that when the content of the glycerol in the aqueous ink is within any of the above-mentioned ranges, ejection failure due to increased viscosity can be reduced. However, this may not be the only cause.

Resin Particles

It is preferable that the aqueous ink include resin particles. When the aqueous ink includes resin particles, the aqueous ink tends to have higher ejection reliability and ink storage stability.

The resin particles may be self-dispersible resin particles in which a hydrophilic component is incorporated to enable the resin particles to be stably dispersed in water. The resin particles may be resin particles that can be rendered water-dispersible with the use of an external emulsifier.

Examples of the resin particles include acrylic-based resin particles, urethane-based resin particles, polyester-based resin particles, fluorene-based resin particles, polyolefin-based resin particles, rosin-modified resin particles, terpene-based resin particles, polyamide-based resin particles, epoxy-based resin particles, vinyl chloride-based resin particles, vinyl chloride-vinyl acetate copolymer particles, and ethylene vinyl acetate-based resin particles. In particular, it is preferable that the resin particles be as follows. From the standpoint of achieving better high-temperature continuous printability, it is preferable that the resin particles be acrylic-based resin particles, polyester-based resin particles, or urethane-based resin particles. From the standpoint of achieving better ink storage stability, it is preferable that the resin particles be acrylic-based resin particles or urethane-based resin particles. From the standpoint of achieving better high-temperature continuous printability and ink storage stability, it is preferable that the resin particles be acrylic-based resin particles.

The "acrylic-based resin" is a general term that refers to polymers obtained by polymerizing a material including at least, as one component, an acrylic-based monomer, such as (meth)acrylic acid or a (meth)acrylic acid ester. Examples of the acrylic-based resin include resins produced from an acrylic-based monomer and copolymers of an acrylic-based monomer and a monomer other than an acrylic-based monomer. Examples of the acrylic-based monomer include acrylic monomers and methacrylic monomers. Examples of the copolymers include an acrylic-vinyl-based resin, which is a copolymer of an acrylic-based monomer and a vinyl-based monomer. An example of the acrylic-vinyl-based resin may be a styrene-acrylic-based resin, which is a copolymer of an acrylic-based monomer and a styrene monomer used as the vinyl-based monomer. Examples of the styrene monomer include styrene and styrene derivatives, such as α-methylstyrene. The styrene-acrylic-based resin in the styrene-acrylic-based resin particles may be in the form of any of the following: a random copolymer, a block copolymer, an alternating copolymer, and a graft copolymer.

From the standpoint of achieving better high-temperature continuous printability and ink storage stability, it is preferable that the styrene-acrylic-based resin be a styrene-acrylic-based resin containing, as a constituent component, a methacrylic monomer. Examples of such styrene-acrylic-based resins include styrene-methacrylic acid copolymers and styrene-methacrylic acid-acrylic acid ester copolymers. Particles of these styrene-acrylic-based resins may be commercially available products or preparations prepared in accordance with a known method.

From the standpoint of achieving better high-temperature continuous printability and ink storage stability, it is preferable that the styrene-acrylic-based resin be a styrene-acrylic-based resin containing, as a constituent component, an α-methylstyrene monomer. Examples of such styrene-acrylic-based resins include styrene-α-methylstyrene-acrylic acid copolymers and styrene-α-methylstyrene-acrylic acid-acrylic acid ester copolymers.

Examples of the urethane-based resin in the urethane-based resin particles include polyether-based polyurethane resins, polyester-based resins, and polycarbonate-based resins. The urethane-based resin particles may be a commercially available product. Examples of the commercially available product include TAKELAC (registered trademark) W-6061 (manufactured by Mitsui Chemicals, Inc.), TAKELAC (registered trademark) W-6021 (manufactured by Mitsui Chemicals, Inc.), and WBR-016U (manufactured by Taisei Fine Chemical Co., Ltd.).

The polyester-based resin particles may be a commercially available product. Examples of the commercially available product include Vylonal MD-1100 and Vylonal MD-1500 (manufactured by Toyobo Co., Ltd.).

A content of the resin particles is preferably 0.2 mass % or greater and 5 mass % or less, more preferably 0.3 mass % or greater and 3 mass % or less, even more preferably 0.5 mass % or greater and 2 mass % or less, and still further preferably 0.7 mass % or greater and 1.5 mass % or less, relative to the total mass of the aqueous ink.

Surfactant

The aqueous ink may include a surfactant. Examples of the surfactant include acetylene glycol-based surfactants, fluorosurfactants, and silicone-based surfactants.

Examples of the acetylene glycol-based surfactants include Olfine 104 series and Olfine E series such as Olfine E1010 (products of Air Products and Chemicals Inc.) and Surfynol 465 and Surfynol 61 (products of Nissin Chemical Industry Co., Ltd.).

Examples of the fluorosurfactants include S-144 and S-145 (products of Asahi Glass Co., Ltd.); FC-170C, FC-430, and Fluorad FC4430 (products of Sumitomo 3M Ltd.); FSO, FSO-100, FSN, FSN-100, and FS-300 (manufactured by DuPont); and FT-250 and FT-251 (products of Neos Company Limited).

Examples of the silicone-based surfactants include BYK-306, BYK-307, BYK-333, BYK-341, BYK-345, BYK-346, BYK-347, BYK-348, and BYK-349 (products of BYK Japan KK) and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (products of Shin-Etsu Chemical Co., Ltd.).

A content of the surfactant may be 0.1 mass % or greater and 0.5 mass % or less relative to the total mass of the aqueous ink.

Neutralizing Agent

The aqueous ink may include a neutralizing agent, which serves to improve the dispersion stability of the resin particles. Examples of the neutralizing agent include organic bases, such as N,N-dimethylethanolamine, N,N-diethylethanolamine, diethanolamine, triethanolamine, triisopropanolamine, trimethylamine, and triethylamine; and inorganic bases, such as sodium hydroxide, potassium hydroxide, and ammonia.

A content of the neutralizing agent may be 1 mass % or greater and 3 mass % or less relative to the total mass of the aqueous ink.

Water

The aqueous ink may include water. The water is not particularly limited. Examples of the water include purified water, such as ion-exchanged water, ultrafiltrated water, reverse osmosis water, and distilled water, and ultrapure water. The aqueous ink is an ink including at least water as a solvent component of the ink.

A content of the water is, for example, greater than or equal to 30 mass % relative to the total mass the aqueous ink; the content is preferably greater than or equal to 50 mass %, more preferably greater than or equal to 60 mass %, and even more preferably greater than or equal to 70 mass %. The upper limit is not limited and is preferably less than or equal to 95 mass %, more preferably less than or equal to 90 mass %, and even more preferably less than or equal to 80 mass %.

The aqueous ink is for use in an ink jet apparatus provided with an ink jet head including nozzles that have a side wall surface, the side wall surface having a scalloped shape in which a scallop width S1 and a notch depth S2 satisfy a relationship of $S1/S2 \geq 4$. The aqueous ink is an ink for use in an ink jet recording method that includes performing recording by ejecting ink from such an ink jet head. The "scalloped shape" refers to a shape such that the nozzle side wall has a continuous multi-step profile extending in a direction in which ink passes through the nozzle, as viewed in a cross section of the nozzle. An example of such an ink jet head is an ink jet recording head disclosed in JP-A-2018-002778, for example.

FIG. 1 is a cross-sectional view illustrating a cross-sectional shape of a portion of a side wall of a nozzle. In the case in which a shape of the side wall surface of a nozzle 100 is a scalloped shape, as illustrated in FIG. 1, a problem arises in that when pigment-containing aqueous ink is ejected, alignment degradation tends to occur. In cases in which a related-art aqueous ink is used, the aqueous ink dries in the interiors of the nozzles because of the large surface area of the interiors of the nozzles, when the aqueous ink is ejected and the meniscus is drawn in. Further, the solids, which primarily includes the pigment, adhere and accumulate in the interiors of the nozzles, which results in, for example, a deviation in the ejection direction and a failure to eject the aqueous ink. In contrast, in cases in which the aqueous ink of the present embodiment is used in an ink jet recording apparatus including an ink jet head that includes the nozzles described above, excellent ejection reliability is achieved because deviations in the ejection direction tend not to occur, and misfiring of the aqueous ink is inhibited.

The nozzles are formed as orifices provided in a nozzle-forming substrate and extending therethrough. It is sufficient that at least a portion of the side wall of the nozzles have a scalloped shape. In a cross-sectional view of a nozzle, it is preferable that 30% or more of the side wall, in a direction of the nozzle thickness (nozzle length in a thickness direction of the nozzle-forming substrate), have a scalloped shape, it is more preferable that 50% or more of the side wall have a scalloped shape, and it is even more preferable that 80% or more of the side wall have a scalloped shape.

The thickness of the nozzle-forming substrate is preferably greater than or equal to 20 μm. Although there is no limitation, the thickness is more preferably 20 μm or greater and 300 μm or less, even more preferably 30 μm or greater and 200 μm or less, still more preferably 40 μm or greater and 100 μm or less, and particularly preferably 45 μm or greater and 80 μm or less. It is preferable that the nozzle length in the thickness direction of the nozzle-forming substrate be also within any of the above-mentioned ranges.

A diameter of the nozzle, which is an outermost diameter on the ink-ejection side, is preferably 5 μm or greater and 50 μm or less, more preferably 10 μm or greater and 40 μm or less, and even more preferably 15 μm or greater and 30 μm or less. In these cases, the nozzles can be easily formed, and an ejection performance can be easily achieved. Accordingly, these cases are preferable.

A material that forms the nozzle-forming substrate is preferably a material that can be surface-etched by an etching process. More preferably, the material is an inorganic material. Examples of such materials include metals, semi-metals, and inorganic compounds thereof. For example, the material may be silicon.

As is apparent from FIG. 1, the scallop width S1 is a distance between adjacent protrusions of the scalloped shape. In FIG. 1, the scallop width S1 is denoted by 5100. The notch depth S2 is a depth of a recess formed in the side wall surface in a vicinity of the open end of the nozzle. In FIG. 1, the notch depth S2 is denoted by 5200. In the case in which a plurality of protrusions or recesses are present, the scallop width S1 is the average of the distances, which are as defined above, and the notch depth S2 is the average of the depths, which are as defined above. When the relationship of S1/S2≥4 is satisfied, instances in which the aqueous ink is left on the scallop stepped portions are reduced; therefore, a decrease in ejection reliability, which may occur if the ink dries on the stepped portions, can be reduced, and, consequently, excellent ejection reliability is achieved. Larger S1/S2 values result in higher ejection reliability, and, in this regard, larger S1/S2 values are preferable. Smaller small S1/S2 values are preferable in that, for example, the etching processes to be performed for the production of the nozzles can be reduced. In a case in which the S1/S2 value is less than or equal to the above-mentioned range, the nozzle holes can be easily produced, and, in this regard, such S1/S2 values are also preferable. From a similar standpoint, it is preferable that S1/S2 be from 4 to 30. S1/S2 is more preferably from 4.5 to 20, even more preferably from 5 to 15, and still more preferably from 5 to 10.

It is preferable that the scallop width S1 and the notch depth S2 be each less than or equal to 1.0 μm. The scallop width S1 is preferably 0.3 μm or greater and 1.0 μm or less, more preferably 0.4 μm or greater and 0.8 μm or less, and particularly preferably 0.45 μm or greater and 0.7 μm or less. The notch depth S2 is preferably 0.010 μm or greater and 0.30 μm or less, and more preferably 0.015 μm or greater and 0.20 μm or less, and particularly preferably 0.020 μm or greater and 0.15 μm or less. In these cases, the nozzles can be easily formed, and a nozzle performance can be easily achieved. Accordingly, these cases are preferable.

It is preferable that the nozzles be nozzles formed by performing an etching process and an etching side wall protection process alternately and repeatedly several times. In this case, a high-density nozzle array can be easily produced, and the production can be carried out with high precision. Accordingly, such a case is preferable. An ink jet head produced in this manner enables high-resolution and high-definition image recording, and, therefore, such a case is preferable. In a case in which nozzles are formed in this manner, a side wall surface of the nozzles tends to have a scalloped shape. Since the nozzles are formed in this manner, the excellent ejection reliability of the aqueous ink tends to be exhibited even more effectively.

Examples of methods for forming the nozzles include a method in which a BOSCH process is used to form the nozzles. More specifically, the nozzles are formed by etching a silicon substrate by performing dry etching in multiple steps.

Figure 2:
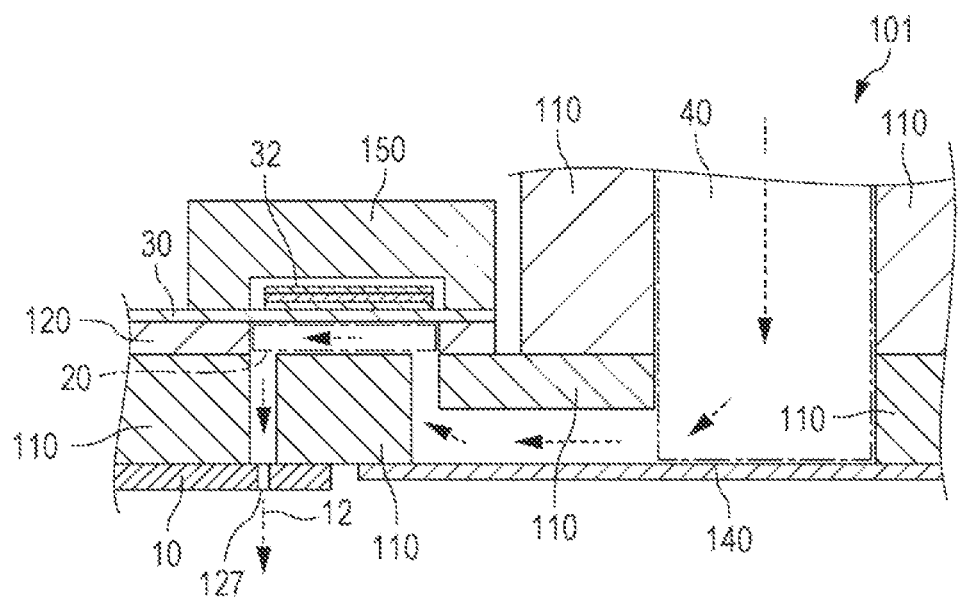
FIG. 2 is a cross-sectional view illustrating a portion of an ink jet head.

FIG. 2 is a cross-sectional view illustrating a portion of an exemplary ink jet head. The ink jet head 101 includes a nozzle plate 10, which is a nozzle-forming substrate, a channel-forming substrate 110, a pressure chamber substrate 120, a diaphragm 30, a piezoelectric element 32, a compliance sheet 140, and a cover 150. The nozzle plate 10 includes a nozzle 127 formed therein. The nozzle 127 is an orifice extending through the nozzle plate 10. A pressure chamber 20 is formed as a space defined by the channel-forming substrate 110, the pressure chamber substrate 120, and the diaphragm 30. Displacement of the diaphragm 30 causes a volume of the pressure chamber 20 to change, thereby generating a force for ejecting ink from the nozzles. An ink supply chamber 40 is formed as a space defined by the channel-forming substrate 110 and the compliance sheet 140. A channel is formed as a passageway for ink defined by the channel-forming substrate 110 and the compliance sheet 140. The channel extends from the ink supply chamber to the pressure chamber and from the pressure chamber to the nozzle. The ink flows and moves along the arrows illustrated in FIG. 2 and is ejected from the nozzle. In FIG. 2, reference numeral 12 indicates a portion where the ink is ejected from the nozzle.

Figure 3:
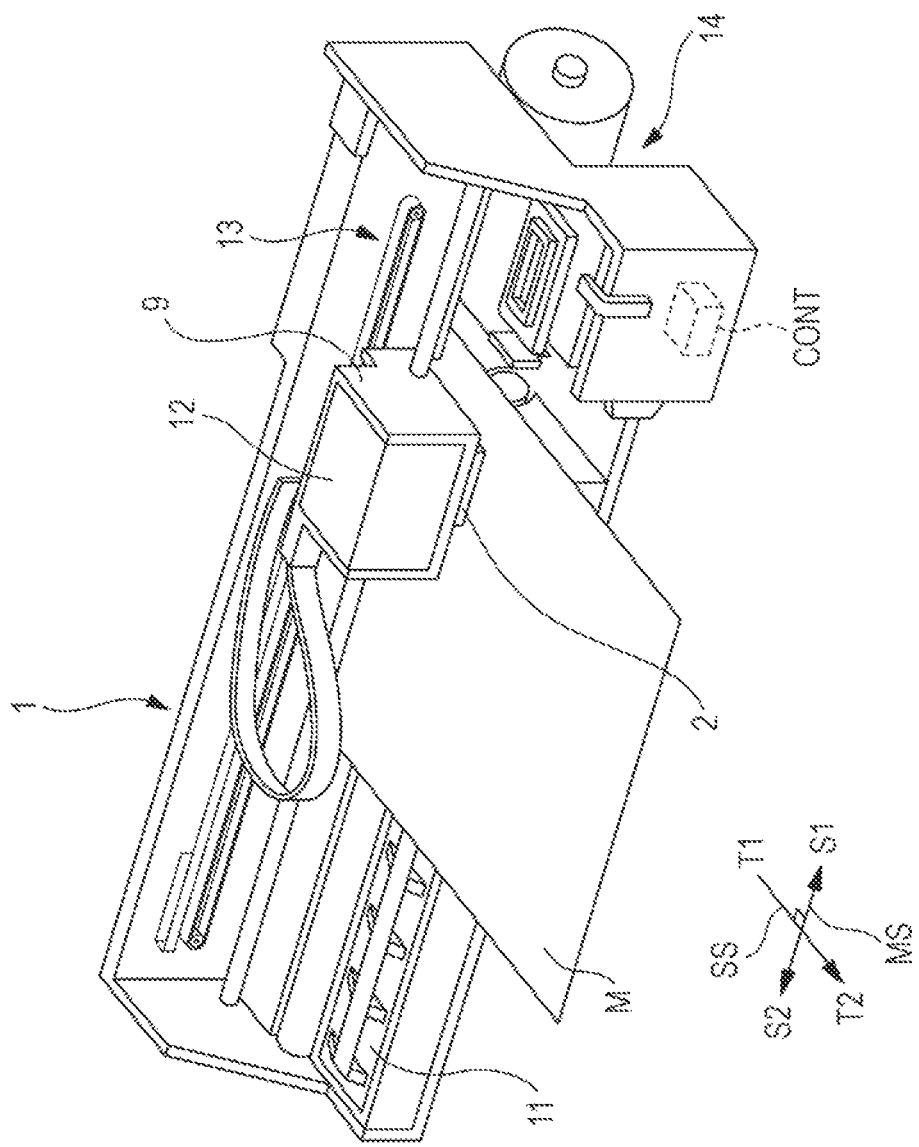
FIG. 3 is a perspective view illustrating an ink jet recording apparatus.

FIG. 3 is a perspective view illustrating an exemplary configuration of an ink jet recording apparatus. As illustrated in FIG. 3, an ink jet recording apparatus 1 includes an ink jet head 2, a carriage 9, a platen 11, a carriage movement mechanism 13, a transport unit 14, a controller CONT, and an ink container 12. In the ink jet recording apparatus 1, the controller CONT illustrated in FIG. 3 controls the operation of the entire ink jet recording apparatus 1. The ink jet head 2 performs recording on a recording medium M by ejecting ink from the nozzles disposed in the bottom of the ink jet head 2 and depositing the ink onto the recording medium M. While performing main scanning in a main scanning direction MS relative to the recording medium M, the ink jet head 2 ejects ink to deposit the ink onto the recording medium M. The recording medium M is transported in a transport direction SS, and thus sub-scanning is performed. The main scanning and the sub-scanning are performed alternately and repeatedly, and, accordingly, recording is carried out.

Ink Jet Recording Method

An ink jet recording method of the present embodiment is an ink jet recording method that is implemented by using an ink jet head including nozzles that have a side wall surface, the side wall surface having a scalloped shape in which a scallop width S1 and a notch depth S2 satisfy a relationship of S1/S2≥4. The ink jet recording method includes an ejection step of ejecting the aqueous ink of the present embodiment from the ink jet head.

Ejection Step

In the ejection step, the aqueous ink is deposited onto a recording target medium by being ejected from the ink jet head, for example. A method for the ejection is, for example, a known method.

Examples of the recording target medium (recording medium) include, but are not limited to, paper for ink jet exclusive use, plain paper such as PPC, fabrics, surface-treated paper (e.g., aluminum-deposited paper, coated paper, art paper, and cast coated paper), and plastic films (e.g., polycarbonate films, PET films, and vinyl chloride sheets) formed with an ink-receiving layer. In particular, plain paper, paper for ink jet exclusive use, and the like are preferable in instances in which recording for high-density black characters, pictures, or the like is performed. Furthermore, an absorbent recording medium, which easily absorbs ink, is preferable. An absorbent recording medium is a recording medium having a recording surface formed of, for example, paper, a fabric, or an organic or inorganic material that has an ink-absorbing property.

Examples

The present disclosure will now be described in more detail with reference to examples and comparative examples. The present disclosure is in no way limited to the examples described below.

Preparation of Resin Particles

To a reaction vessel equipped with a dropping device, a thermometer, a water-cooled reflux condenser, and a stirrer, 100 parts by mass of ion-exchanged water was added, and under stirring, 0.4 parts by mass of potassium persulfate, which was used as a polymerization initiator, was added in a nitrogen atmosphere at 70° C. Into the reaction vessel, a monomer solution was added dropwise at 70° C. to cause a polymerization reaction. The monomer solution included 37 parts by mass of ion-exchanged water, 0.25 parts by mass of sodium lauryl sulfate, 22 parts by mass of styrene, 50 parts by mass of n-butyl acrylate, 47 parts by mass of methyl acrylate, 20 parts by mass of ethyl acrylate, 5 parts by mass of acrylic acid, and 0.52 parts by mass of tert-dodecyl mercaptan. The contents of the reaction vessel after the reaction were neutralized with sodium hydroxide to adjust the pH to a pH of 8 to 8.5 and were filtered through a 0.3-μm filter. Thus, an aqueous dispersion liquid of resin particles was prepared.

Preparation of Self-Dispersed Pigment 1

500 g of original carbon black powder prepared by a furnace process (a primary particle diameter=18 nm, a BET specific surface area=180 $m^2/g$, and a DBP absorption=186 mL/100 g) was added to 3750 g of ion exchanged water, which was then heated to 45° C. while being stirred using a dissolver. Subsequently, while the resultant was milled in a sand mill with 0.8 mm-diameter zirconia beads, 30000 g of an aqueous sodium hypochlorite solution (an effective chlorine concentration=12%) was added dropwise thereto at 45° C. over 3.5 hours. Then, the milling was continued in the sand mill for another 30 minutes, and, accordingly, a reaction liquid that contained self-dispersible carbon black was obtained. The reaction liquid was filtered through a 400-mesh wire sieve to separate the reaction liquid from the zirconia beads and unreacted carbon black. The pH of the reaction liquid resulting from the separation was adjusted to a pH of 7.5 by adding a 5% aqueous potassium hydroxide solution to the reaction liquid. The reaction liquid was desalinated and purified using an ultrafiltration membrane until the electric conductivity of the liquid reached 1.5 mS/cm. By using an electrodialysis apparatus, the reaction liquid was further desalinated and purified until the electric conductivity of the liquid reached 1.0 mS/cm. The resulting liquid was concentrated until a concentration of the self-dispersible carbon black reached 17 mass %. The concentrated liquid was centrifuged to remove coarse particles, and the resultant was filtered through a 0.6-μm filter. Ion exchanged water was added to the resulting filtrate to dilute the filtrate until the concentration of the self-dispersible carbon black reached 15 mass %. The carbon black was allowed to disperse, and, accordingly, a self-dispersed pigment 1 was obtained. The self-dispersed pigment 1 had an average particle diameter of 110 nm and a specific surface area of 11 $m^2/g$.

Preparation of Self-Dispersed Pigments 2 and 3

Self-dispersed pigments were prepared in a manner similar to that for the self-dispersed pigment 1, described above, except that the duration of the milling, which was performed using a sand mill after the dropwise addition of the aqueous sodium hypochlorite solution, was extended. The duration of the milling was adjusted such that the resulting self-dispersed pigment had an average particle diameter of 80 nm. In this manner, a self-dispersed pigment 2 was obtained. Furthermore, in a separate operation, the duration of the milling was reduced such that the resulting self-dispersed pigment had an average particle diameter of 140 nm. In this manner, a self-dispersed pigment 3 was obtained. Both the self-dispersed pigments 2 and 3 had a specific surface area of 11 $m^2/g$.

Preparation of Self-Dispersed Pigments 4 and 5

Self-dispersed pigments were prepared in a manner similar to that for the self-dispersed pigment 1 except that the amount of the aqueous sodium hypochlorite solution, which was added dropwise, was increased. The amount of the aqueous sodium hypochlorite solution, which was added dropwise, was adjusted such that the resulting self-dispersed pigment had a specific surface area of 25 $m^2/g$. In this manner, a self-dispersed pigment 4 was obtained. Furthermore, in a separate operation, the amount of the aqueous sodium hypochlorite solution, which was added dropwise, was adjusted such that the resulting self-dispersed pigment had a specific surface area of 35 $m^2/g$. In this manner, a self-dispersed pigment 5 was obtained. Both the self-dispersed pigments 4 and 5 had an average particle diameter of 110 nm.

Preparation of Resin-Dispersed Pigment 10 parts by mass of a polymer component and 55 parts by mass of ion exchanged water were added to 15 parts by mass of carbon black. The polymer component was an ammonium salt of a styrene-acrylic acid copolymer (which had a weight average molecular weight of 10000), which was used as a dispersing agent. The ingredients were thoroughly mixed together, and thereafter, the mixture was dispersed with glass beads (which had a diameter of 1.7 mm and was in an amount 1.5 times an amount of the mixture) in a sand mill (manufactured by Yasukawa Seisakusho Co., Ltd.) for 2 hours. After dispersion, the glass beads were removed, and, accordingly, a resin-dispersed pigment dispersion liquid was obtained.

Preparation of Aqueous Ink Jet Ink Composition

Next, the self-dispersed pigment or the resin-dispersed pigment was mixed with the resin particle dispersion liquid and the other components shown in the tables below, and the mixture was stirred, and then the resulting mixture was filtered through a 5-μm filter. Accordingly, an aqueous ink jet ink composition was prepared. Note that in the tables, the numerical values are expressed in parts by mass, and a total amount of the aqueous ink jet ink composition is 100.0 parts by mass. The contents of the pigment and the resin particles are on a solids basis. In the tables, the propanol is isopropanol.

The average particle diameter of the self-dispersed pigment was determined in the following manner. A sample was prepared by diluting the aqueous ink jet ink composition with purified water in a manner such that the pigment concentration became 50 ppm. The sample was analyzed by using a dynamic light scattering Nanotrac particle size distribution analyzer (a model Nanotrac 150, which is a product of MicrotracBEL Corporation) to measure the volume average particle diameter D50.

The specific surface area of the self-dispersed pigment was determined in the following manner.
Measurement Conditions
  Pulsed NMR: Acorn Drop, manufactured by Xigo nanotools
  Measurement Temperature: 30° C.
  Measurement Sample: 0.5 mL
  Measurement Sample A1: each of the aqueous pigment inks
  Measurement Sample A2: the supernatant resulting from centrifugation (415000 g, 60 minutes, and 25° C.) of the measurement sample A1

$$Sp=\{[(Rav/Rb)-1]\times Rb\}/(0.0016\times \psi p)$$

In the equation, Sp is the specific surface area [$m^2/g$] of the pigment present in the ink composition, Rav is the reciprocal of the measured value of the measurement sample A1, which was determined by pulsed NMR, Rb is the reciprocal of the measured value of the measurement sample A2, which was determined by pulsed NMR, and $\psi p$ is a value determined by calculation using the following equation.

$$\psi p=(Sc/Sd)/[(1-Sc)/Td]$$

In the equation, Sc is a pigment solids concentration (mass %) of the measurement sample A1, Sd is a density of the pigment of the measurement sample A1, and Td is a density of the supernatant of the measurement sample A2.

Note that Sd is, for example, 1.7 when the pigment is carbon black. When the supernatant is substantially water, Td is 1.0, which is a density of water. Sc was determined by measurement or calculation from the composition of the aqueous pigment ink.

TABLE 1

|  |  | Manufacturer | Ex. 1 | Ex. 2 | Ex. 3 | Ex. 4 | Ex. 5 |
|---|---|---|---|---|---|---|---|
| Head b/a |  |  | 4 | 4 | 4 | 4 | 4 |
| Solvent of general formula (1) | Ethylene glycol |  | 10.0 |  |  |  |  |
|  | Propylene glycol | ADEKA |  | 10.0 |  |  |  |
|  | 1,4-butanediol | Tokyo Chemical Industry |  |  | 10.0 |  |  |
|  | 1,5-pentanediol | Tokyo Chemical Industry |  |  |  | 10.0 |  |
|  | Ethylene glycol monomethyl ether |  |  |  |  |  | 10.0 |
|  | Propylene glycol monomethyl ether |  |  |  |  |  |  |
|  | 1-methoxy butanol | Tokyo Chemical Industry |  |  |  |  |  |
|  | Ethylene glycol monoethyl ether | Tokyo Chemical Industry |  |  |  |  |  |
|  | Propylene glycol monoethyl ether | Tokyo Chemical Industry |  |  |  |  |  |
|  | Diethylene glycol | Nippon Nyukazai |  |  |  |  |  |
|  | Diethylene glycol monomethyl ether |  |  |  |  |  |  |
|  | Diethylene glycol monoethyl ether | Tokyo Chemical Industry |  |  |  |  |  |
|  | Dipropylene glycol | ADEKA |  |  |  |  |  |
|  | Dipropylene glycol monomethyl ether |  |  |  |  |  |  |
| Monoalcohol solvent | Methanol |  |  |  |  |  |  |
|  | Ethanol |  |  |  |  |  |  |
|  | Propanol |  |  |  |  |  |  |
| Other solvents | Glycerol | Sakamoto Yakuhin Kogyo | 7.0 | 7.0 | 7.0 | 7.0 | 7.0 |
|  | 2-pyrrolidone | Tokyo Chemical Industry | 1.0 | 1.0 | 1.0 | 1.0 | 1.0 |
|  | 3-methyl-1,5-pentanediol |  | 3.0 | 3.0 | 3.0 | 3.0 | 3.0 |
|  | Triethylene glycol |  |  |  |  |  |  |
|  | 1,2-hexanediol | Tokyo Chemical Industry |  |  |  |  |  |
|  | Diethylene glycol monobutyl ether |  |  |  |  |  |  |
|  | Triethylene glycol monobutyl ether |  |  |  |  |  |  |
| Pigment | Self-dispersed pigment 1 |  | 6.0 | 6.0 | 6.0 | 6.0 | 6.0 |
|  | Self-dispersed pigment 2 |  |  |  |  |  |  |
|  | Self-dispersed pigment 3 |  |  |  |  |  |  |
|  | Self-dispersed pigment 4 |  |  |  |  |  |  |
|  | Self-dispersed pigment 5 |  |  |  |  |  |  |
|  | Resin-dispersed pigment |  |  |  |  |  |  |
| Surfactant | BYK-348 | BYK Japan | 0.3 | 0.3 | 0.3 | 0.3 | 0.3 |
| Neutralizing agent | Triisopropanolamine | Tokyo Chemical Industry | 2.0 | 2.0 | 2.0 | 2.0 | 2.0 |
| Resin particles |  |  | 1.0 | 1.0 | 1.0 | 1.0 | 1.0 |
| Purified water |  |  | Balance | Balance | Balance | Balance | Balance |
| Total |  |  | 100.0 | 100.0 | 100.0 | 100.0 | 100.0 |

TABLE 1-continued

| | | | | | | | |
|---|---|---|---|---|---|---|---|
| Evaluations | Ejection reliability | Room-temperature continuous ejection stability | A | A | A | A | A |
| | | Intermittent ejection stability | AA | A | A | A | A |
| | | High-temperature continuous ejection stability | AA | A | A | A | B |
| | Settling characteristics | | A | A | A | A | A |
| | Image quality (OD value) | | A | A | A | A | A |

| | | Manufacturer | Ex. 6 | Ex. 7 | Ex. 8 | Ex. 9 | Ex. 10 |
|---|---|---|---|---|---|---|---|
| Head b/a | | | 4 | 4 | 4 | 4 | 4 |
| Solvent of general formula (1) | Ethylene glycol | | | | | | |
| | Propylene glycol | ADEKA | | | | | |
| | 1,4-butanediol | Tokyo Chemical Industry | | | | | |
| | 1,5-pentanediol | Tokyo Chemical Industry | | | | | |
| | Ethylene glycol monomethyl ether | | | | | | |
| | Propylene glycol monomethyl ether | | | 10.0 | | | |
| | 1-methoxy butanol | Tokyo Chemical Industry | | | 10.0 | | |
| | Ethylene glycol monoethyl ether | Tokyo Chemical Industry | | | | 10.0 | |
| | Propylene glycol monoethyl ether | Tokyo Chemical Industry | | | | | 10.0 |
| | Diethylene glycol | Nippon Nyukazai | | | | | 10.0 |
| | Diethylene glycol monomethyl ether | | | | | | |
| | Diethylene glycol monoethyl ether | Tokyo Chemical Industry | | | | | |
| | Dipropylene glycol | ADEKA | | | | | |
| | Dipropylene glycol monomethyl ether | | | | | | |
| Monoalcohol solvent | Methanol | | | | | | |
| | Ethanol | | | | | | |
| | Propanol | | | | | | |
| Other solvents | Glycerol | Sakamoto Yakuhin Kogyo | 7.0 | 7.0 | 7.0 | 7.0 | 7.0 |
| | 2-pyrrolidone | Tokyo Chemical Industry | 1.0 | 1.0 | 1.0 | 1.0 | 1.0 |
| | 3-methyl-1,5-pentanediol | | 3.0 | 3.0 | 3.0 | 3.0 | 3.0 |
| | Triethylene glycol | | | | | | |
| | 1,2-hexanediol | Tokyo Chemical Industry | | | | | |
| | Diethylene glycol monobutyl ether | | | | | | |
| | Triethylene glycol monobutyl ether | | | | | | |
| Pigment | Self-dispersed pigment 1 | | 6.0 | 6.0 | 6.0 | 6.0 | 6.0 |
| | Self-dispersed pigment 2 | | | | | | |
| | Self-dispersed pigment 3 | | | | | | |
| | Self-dispersed pigment 4 | | | | | | |
| | Self-dispersed pigment 5 | | | | | | |
| | Resin-dispersed pigment | | | | | | |
| Surfactant | BYK-348 | BYK Japan | 0.3 | 0.3 | 0.3 | 0.3 | 0.3 |
| Neutralizing agent | Triisopropanolamine | Tokyo Chemical Industry | 2.0 | 2.0 | 2.0 | 2.0 | 2.0 |
| Resin particles | | | 1.0 | 1.0 | 1.0 | 1.0 | 1.0 |
| Purified water | | | Balance | Balance | Balance | Balance | Balance |
| Total | | | 100.0 | 100.0 | 100.0 | 100.0 | 100.0 |
| Evaluations | Ejection reliability | Room-temperature continuous ejection stability | A | A | A | A | A |
| | | Intermittent ejection stability | A | A | A | A | AA |
| | | High-temperature continuous ejection stability | B | B | B | B | AA |
| | Settling characteristics | | A | A | A | A | A |
| | Image quality (OD value) | | A | A | A | A | A |

TABLE 2

|  |  | Manufacturer | Ex. 11 | Ex. 12 | Ex. 13 | Ex. 14 | Ex. 15 |
|---|---|---|---|---|---|---|---|
| Head b/a |  |  | 4 | 4 | 4 | 4 | 4 |
| Solvent of general formula (1) | Ethylene glycol | ADEKA |  |  |  |  | 8.0 |
|  | Propylene glycol | ADEKA |  |  |  |  |  |
|  | 1,4-butanediol | Tokyo Chemical Industry |  |  |  |  |  |
|  | 1,5-pentanediol | Tokyo Chemical Industry |  |  |  |  |  |
|  | Ethylene glycol monomethyl ether |  |  |  |  |  |  |
|  | Propylene glycol monomethyl ether |  |  |  |  |  |  |
|  | 1-methoxy butanol | Tokyo Chemical Industry |  |  |  |  |  |
|  | Ethylene glycol monoethyl ether | Tokyo Chemical Industry |  |  |  |  |  |
|  | Propylene glycol monoethyl ether | Tokyo Chemical Industry |  |  |  |  |  |
|  | Diethylene glycol |  |  |  |  |  |  |
|  | Diethylene glycol monomethyl ether |  | 10.0 |  |  |  |  |
|  | Diethylene glycol monoethyl ether | Tokyo Chemical Industry |  | 10.0 |  |  |  |
|  | Dipropylene glycol | ADEKA |  |  | 10.0 |  |  |
|  | Dipropylene glycol monomethyl ether |  |  |  |  | 10.0 |  |
| Monoalcohol solvent | Methanol |  |  |  |  |  |  |
|  | Ethanol |  |  |  |  |  |  |
|  | Propanol |  |  |  |  |  |  |
| Other solvents | Glycerol | Sakamoto Yakuhin Kogyo | 7.0 | 7.0 | 7.0 | 7.0 | 7.0 |
|  | 2-pyrrolidone | Tokyo Chemical Industry | 1.0 | 1.0 | 1.0 | 1.0 | 1.0 |
|  | 3-methyl-1,5-pentanediol |  | 3.0 | 3.0 | 3.0 | 3.0 | 3.0 |
|  | Triethylene glycol |  |  |  |  |  |  |
|  | 1,2-hexanediol | Tokyo Chemical Industry |  |  |  |  |  |
|  | Diethylene glycol monobutyl ether |  |  |  |  |  |  |
|  | Triethylene glycol monobutyl ether |  |  |  |  |  |  |
| Pigment | Self-dispersed pigment 1 |  | 6.0 | 6.0 | S. | 6.0 | 6.0 |
|  | Self-dispersed pigment 2 |  |  |  |  |  |  |
|  | Self-dispersed pigment 3 |  |  |  |  |  |  |
|  | Self-dispersed pigment 4 |  |  |  |  |  |  |
|  | Self-dispersed pigment 5 |  |  |  |  |  |  |
|  | Resin-dispersed pigment |  |  |  |  |  |  |
| Surfactant | BYK-348 | BYK Japan | 0.3 | 0.3 | 0.3 | 0.3 | 0.3 |
| Neutralizing agent | Triisopropanolamine | Tokyo Chemical Industry | 2.0 | 2.0 | 2.0 | 2.0 | 2.0 |
| Resin particles |  |  | 1.0 | 1.0 | 1.0 | 1.0 | 1.0 |
| Purified water |  |  | Balance | Balance | Balance | Balance | Balance |
| Total |  |  | 100.0 | 100.0 | 100.0 | 100.0 | 100.0 |
| Evaluations | Ejection reliability | Room-temperature continuous ejection stability | A | A | A | A | A |
|  |  | Intermittent ejection stability | B | B | A | B | A |
|  |  | High-temperature continuous ejection stability | B | B | B | B | A |
|  | Settling characteristics |  | A | A | A | A | A |
|  | Image quality (OD value) |  | A | A | A | A | A |

|  |  | Manufacturer | Ex. 16 | Ex. 17 | Ex.18 | Ex. 19 | Ex.20 |
|---|---|---|---|---|---|---|---|
| Head b/a |  |  | 4 | 4 | 4 | 4 | 4 |
| Solvent of general formula (1) | Ethylene glycol | ADEKA | 12.0 | 10.0 | 10.0 | 10.0 | 10.0 |
|  | Propylene glycol | ADEKA |  |  |  |  |  |
|  | 1,4-butanediol | Tokyo Chemical Industry |  |  |  |  |  |
|  | 1,5-pentanediol | Tokyo Chemical Industry |  |  |  |  |  |
|  | Ethylene glycol monomethyl ether |  |  |  |  |  |  |
|  | Propylene glycol monomethyl ether |  |  |  |  |  |  |
|  | 1-methoxy butanol | Tokyo Chemical Industry |  |  |  |  |  |
|  | Ethylene glycol monoethyl ether | Tokyo Chemical Industry |  |  |  |  |  |
|  | Propylene glycol monoethyl ether | Tokyo Chemical Industry |  |  |  |  |  |
|  | Diethylene glycol |  |  |  |  |  |  |
|  | Diethylene glycol monomethyl ether |  |  |  |  |  |  |
|  | Diethylene glycol monoethyl ether | Tokyo Chemical Industry |  |  |  |  |  |

TABLE 2-continued

|  |  | Manufacturer |  |  |  |  |  |
|---|---|---|---|---|---|---|---|
|  | Dipropylene glycol | ADEKA |  |  |  |  |  |
|  | Dipropylene glycol monomethyl ether |  |  |  |  |  |  |
| Monoalcohol solvent | Methanol |  |  | 3.0 |  |  |  |
|  | Ethanol |  |  |  |  | 3.0 |  |
|  | Propanol |  |  |  |  |  | 3.0 | 1.0 |
| Other solvents | Glycerol | Sakamoto Yakuhin Kogyo | 7.0 | 7.0 | 7.0 | 7.0 | 7.0 |
|  | 2-pyrrolidone | Tokyo Chemical Industry | 1.0 | 1.0 | 1.0 | 1.0 | 1.0 |
|  | 3-methyl-1,5-pentanediol |  | 3.0 | 3.0 | 3.0 | 3.0 | 3.0 |
|  | Triethylene glycol |  |  |  |  |  |  |
|  | 1,2-hexanediol | Tokyo Chemical Industry |  |  |  |  |  |
|  | Diethylene glycol monobutyl ether |  |  |  |  |  |  |
|  | Triethylene glycol monobutyl ether |  |  |  |  |  |  |
| Pigment | Self-dispersed pigment 1 |  | 6.0 | 6.0 | 6.0 | 6.0 | 6.0 |
|  | Self-dispersed pigment 2 |  |  |  |  |  |  |
|  | Self-dispersed pigment 3 |  |  |  |  |  |  |
|  | Self-dispersed pigment 4 |  |  |  |  |  |  |
|  | Self-dispersed pigment 5 |  |  |  |  |  |  |
|  | Resin-dispersed pigment |  |  |  |  |  |  |
| Surfactant | BYK-348 | BYK Japan | 0.3 | 0.3 | 0.3 | 0.3 | 0.3 |
| Neutralizing agent | Triisopropanolamine | Tokyo Chemical Industry | 2.0 | 2.0 | 2.0 | 2.0 | 2.0 |
| Resin particles |  |  | 1.0 | 1.0 | 1.0 | 1.0 | 1.0 |
| Purified water |  |  | Balance | Balance | Balance | Balance | Balance |
| Total |  |  | 100.0 | 100.0 | 100.0 | 100.0 | 100.0 |
| Evaluations | Ejection reliability | Room-temperature continuous ejection stability | A | AA | AA | AA | A |
|  |  | Intermittent ejection stability | AA | AA | AA | AA | AA |
|  |  | High-temperature continuous ejection stability | AA | A | A | AA | AA |
|  | Settling characteristics |  | A | A | A | A | A |
|  | Image quality (OD value) |  | A | A | A | A | A |

TABLE 3

|  |  | Manufacturer | Ex. 21 | Ex. 22 | C Ex. 23 | Ex. 24 | Ex. 25 |
|---|---|---|---|---|---|---|---|
| Head b/a |  |  | 4 | 4 | 4 | 4 | 4 |
| Solvent of general formula (1) | Ethylene glycol |  |  |  |  | 10.0 | 10.0 |
|  | Propylene glycol | ADEKA |  |  |  |  |  |
|  | 1,4-butanediol | Tokyo Chemical Industry |  |  |  |  |  |
|  | 1,5-pentanediol | Tokyo Chemical Industry |  |  |  |  |  |
|  | Ethylene glycol monomethyl ether |  |  |  |  |  |  |
|  | Propylene glycol monomethyl ether |  |  |  |  |  |  |
|  | 1-methoxy butanol | Tokyo Chemical Industry |  |  |  |  |  |
|  | Ethylene glycol monoethyl ether | Tokyo Chemical Industry |  |  |  |  |  |
|  | Propylene glycol monoethyl ether | Tokyo Chemical Industry |  |  |  |  |  |
|  | Diethylene glycol |  | 10.0 | 10.0 | 10.0 |  |  |
|  | Diethylene glycol monomethyl ether |  |  |  |  |  |  |
|  | Diethylene glycol monoethyl ether | Tokyo Chemical Industry |  |  |  |  |  |
|  | Dipropylene glycol | ADEKA |  |  |  |  |  |
|  | Dipropylene glycol monomethyl ether |  |  |  |  |  |  |
| Monoalcohol solvent | Methano |  |  | 3.0 |  |  |  |
|  | Ethanol |  |  |  | 3.0 |  |  |
|  | Propano |  |  |  |  | 3.0 |  |
| Other solvents | Glycerol | Sakamoto Yakuhin Kogyo | 7.0 | 7.0 | 7.0 | 7.0 | 7.0 |
|  | 2-pyrrolidone | Tokyo Chemical Industry | 1.0 | 1.0 | 1.0 | 1.0 | 1.0 |
|  | 3-methyl-1,5-pentanediol |  | 3.0 | 3.0 | 3.0 | 3.0 | 3.0 |
|  | Triethylene glycol |  |  |  |  |  |  |
|  | 1,2-hexanediol | Tokyo Chemical Industry |  |  |  |  |  |
|  | Diethylene glycol monobutyl ether |  |  |  |  |  |  |
|  | Triethylene glycol monobutyl ether |  |  |  |  |  |  |
| Pigment | Self-dispersed pigment 1 |  | 6.1 | 6.0 | 6. |  |  |
|  | Self-dispersed pigment 2 |  |  |  |  | 6.0 |  |
|  | Self-dispersed pigment 3 |  |  |  |  |  | 6.0 |

TABLE 3-continued

| | | | | | | | | |
|---|---|---|---|---|---|---|---|---|
| | Self-dispersed pigment 4 | | | | | | | |
| | Self-dispersed pigment 5 | | | | | | | |
| | Resin-dispersed pigment | | | | | | | |
| Surfactant | BYK-348 | BYK Japan | 0.3 | 0.3 | 0.3 | 0.3 | 0.3 | |
| Neutralizing agent | Triisopropanolamine | Tokyo Chemical Industry | 2.0 | 2.0 | 2.0 | 2.0 | 2.0 | |
| Resin particles | | | 1.0 | 1.0 | 1.0 | 1.0 | 1.0 | |
| Purified water | | | Balance | Balance | Balance | Balance | Balance | |
| Total | | | 100.0 | 100.0 | 100.0 | 100.0 | 100.0 | |
| Evaluations | Ejection reliability | Room-temperature continuous ejection stability | AA | AA | AA | B | AA | |
| | | Intermittent ejection stability | AA | AA | AA | B | AA | |
| | | High-temperature continuous ejection stability | AA | AA | AA | A | AA | |
| | Settling characteristics | | A | A | A | AA | B | |
| | Image quality (OD value) | | A | A | A | B | AA | |

| | | Manufacturer | Ex. 26 | Ex. 27 | Ex. 28 | Ex. 29 | Ex. 30 | Ex. 31 |
|---|---|---|---|---|---|---|---|---|
| Head b/a | | | 4 | 4 | 4 | 4 | 7 | 13 |
| Solvent of general formula (1) | Ethylene glycol | | 10.0 | 10.0 | 10.0 | 10.0 | 10.0 | 10.0 |
| | Propylene glycol | ADEKA | | | | | | |
| | 1,4-butanediol | Tokyo Chemical Industry | | | | | | |
| | 1,5-pentanediol | Tokyo Chemical Industry | | | | | | |
| | Ethylene glycol monomethyl ether | | | | | | | |
| | Propylene glycol monomethyl ether | | | | | | | |
| | 1-methoxy butanol | Tokyo Chemical Industry | | | | | | |
| | Ethylene glycol monoethyl ether | Tokyo Chemical Industry | | | | | | |
| | Propylene glycol monoethyl ether | Tokyo Chemical Industry | | | | | | |
| | Diethylene glycol | | | | | | | |
| | Diethylene glycol monomethyl ether | | | | | | | |
| | Diethylene glycol monoethyl ether | Tokyo Chemical Industry | | | | | | |
| | Dipropylene glycol | ADEKA | | | | | | |
| | Dipropylene glycol monomethyl ether | | | | | | | |
| Monoalcohol solvent | Methano | | | | | | | |
| | Ethanol | | | | | | | |
| | Propano | | | | | | | |
| Other solvents | Glycerol | Sakamoto Yakuhin Kogyo | 7.0 | 7.0 | 7.0 | 6.0 | 7.0 | 7.0 |
| | 2-pyrrolidone | Tokyo Chemical Industry | 1.0 | 1.0 | 1.0 | 1.0 | 1.0 | 1.0 |
| | 3-methyl-1,5-pentanediol | | 3.0 | 3.0 | 3.0 | 3.0 | 3.0 | |
| | Triethylene glycol | | | | | 2.0 | | |
| | 1,2-hexanediol | Tokyo Chemical Industry | | | | | | |
| | Diethylene glycol monobutyl ether | | | | | | | |
| | Triethylene glycol monobutyl ether | | | | | | | |
| Pigment | Self-dispersed pigment 1 | | | | | 4.0 | 7.0 | 6.0 | 6.0 |
| | Self-dispersed pigment 2 | | | | | | | |
| | Self-dispersed pigment 3 | | | | | | | |
| | Self-dispersed pigment 4 | | 6.0 | | | | | |
| | Self-dispersed pigment 5 | | | 6.0 | | | | |
| | Resin-dispersed pigment | | | | | | | |
| Surfactant | BYK-348 | BYK Japan | 0.3 | 0.3 | 0.3 | 0.3 | 0.3 | 0.3 |
| Neutralizing agent | Triisopropanolamine | Tokyo Chemical Industry | 2.0 | 2.0 | 2.0 | 2.0 | 2.0 | 2.0 |
| Resin particles | | | 1.0 | 1.0 | 1.0 | 1.0 | 1.0 | 1.0 |
| Purified water | | | Balance | Balance | Balance | Balance | Balance | Balance |
| Total | | | 100.0 | 100.0 | 100.0 | 100.0 | 100.0 | 100.0 |
| Evaluations | Ejection reliability | Room-temperature continuous ejection stability | AA | AA | AA | A | AA | AA |
| | | Intermittent ejection stability | AA | AA | AA | B | AA | AA |
| | | High-temperature continuous ejection stability | AA | AA | AA | A | AA | AA |
| | Settling characteristics | | A | AA | A | A | A | A |
| | Image quality (OD value) | | B | C | B | AA | A | A |

TABLE 4

| | | Manufacturer | Comp. Ex. 1 | Comp. Ex. 2 | Comp. Ex. 3 | Comp. Ex. 4 | Comp. Ex. 5 |
|---|---|---|---|---|---|---|---|
| Head b/a | | | 2 | 3 | 4 | 4 | 4 |
| Solvent of general formula (1) | Ethylene glycol | | 10.0 | 10.0 | | | |
| | Propylene glycol | ADEKA | | | | | |
| | 1,4-butanediol | Tokyo Chemical Industry | | | | | |
| | 1,5-pentanediol | Tokyo Chemical Industry | | | | | |
| | Ethylene glycol monomethyl ether | | | | | | |
| | Propylene glycol monomethyl ether | | | | | | |
| | 1-methoxy butanol | Tokyo Chemical Industry | | | | | |
| | Ethylene glycol monoethyl ether | Tokyo Chemical Industry | | | | | |
| | Propylene glycol monoethyl ether | Tokyo Chemical Industry | | | | | |
| | Diethylene glycol | | | | | | |
| | Diethylene glycol monomethyl ether | | | | | | |
| | Diethylene glycol monoethyl ether | Tokyo Chemical Industry | | | | | |
| | Dipropylene glycol | ADEKA | | | | | |
| | Dipropylene glycol monomethyl ether | | | | | | |
| Monoalcohol solvent | Methanol | | | | | | |
| | Ethanol | | | | | | |
| | Propanol | | | | | | |
| Other solvents | Glycerol | Sakamoto Yakuhin Kogyo | 7.0 | 7.0 | 7.0 | 7.0 | 7.0 |
| | 2-pyrrolidone | Tokyo Chemical Industry | 1.0 | 1.0 | 1.0 | 1.0 | 1.0 |
| | 3-methyl-1,5-pentanediol | | 3.0 | 3.0 | 3.0 | 3.0 | 3.0 |
| | Triethylene glycol | | | | | 10.0 | |
| | 1,2-hexanediol | Tokyo Chemical Industry | | | | | 10.0 |
| | Diethylene glycol monobutyl ether | | | | | | |
| | Triethylene glycol monobutyl ether | | | | | | |
| Pigment | Self-dispersed pigment 1 | | 6.0 | 6.0 | 6.0 | 6.0 | 6.0 |
| | Self-dispersed pigment 2 | | | | | | |
| | Self-dispersed pigment 3 | | | | | | |
| | Self-dispersed pigment 4 | | | | | | |
| | Self-dispersed pigment 5 | | | | | | |
| | Resin-dispersed pigment | | | | | | |
| Surfactant | BYK-348 | BYK Japan | 0.3 | 0.3 | 0.3 | 0.3 | 0.3 |
| Neutralizing agent | Triisopropanolamine | Tokyo Chemical Industry | 2.0 | 2.0 | 2.0 | 2.0 | 2.0 |
| Resin particles | | | 1.0 | 1.0 | 1.0 | 1.0 | 1.0 |
| Purified water | | | Balance | Balance | Balance | Balance | Balance |
| Total | | | 100.0 | 100.0 | 100.0 | 100.0 | 100.0 |
| Evaluations | Ejection reliability | Room-temperature continuous ejection stability | C | C | C | C | C |
| | | Intermittent ejection stability | C | C | C | B | C |
| | | High-temperature continuous ejection stability | C | C | C | C | C |
| | Settling characteristics | | A | A | A | A | A |
| | Image quality (OD value) | | A | A | A | A | A |

| | | Manufacturer | Comp. Ex. 6 | Comp. Ex. 7 | Comp. Ex. 8 | Comp. Ex. 9 | Comp. Ex. 10 |
|---|---|---|---|---|---|---|---|
| Head b/a | | | 4 | 4 | 4 | 4 | 4 |
| Solvent of general formula (1) | Ethylene glycol | | | | | | |
| | Propylene glycol | ADEKA | | | | | |
| | 1,4-butanediol | Tokyo Chemical Industry | | | | | |
| | 1,5-pentanediol | Tokyo Chemical Industry | | | | | |
| | Ethylene glycol monomethyl ether | | | | | | |
| | Propylene glycol monomethyl ether | | | | | | |
| | 1-methoxy butanol | Tokyo Chemical Industry | | | | | |
| | Ethylene glycol monoethyl ether | Tokyo Chemical Industry | | | | | |
| | Propylene glycol monoethyl ether | Tokyo Chemical Industry | | | | | |
| | Diethylene glycol | | | | | | |
| | Diethylene glycol monomethyl ether | | | | | | |
| | Diethylene glycol monoethyl ether | Tokyo Chemical Industry | | | | | |

TABLE 4-continued

|  |  | Manufacturer |  |  |  |  |  |
|---|---|---|---|---|---|---|---|
|  | Dipropylene glycol | ADEKA |  |  |  |  |  |
|  | Dipropylene glycol monomethyl ether |  |  |  |  |  |  |
| Monoalcohol solvent | Methanol |  |  |  | 10.0 |  |  |
|  | Ethanol |  |  |  |  | 10.0 |  |
|  | Propanol |  |  |  |  |  | 10.0 |
| Other solvents | Glycerol | Sakamoto Yakuhin Kogyo | 7.0 | 7.0 | 7.0 | 7.0 | 7.0 |
|  | 2-pyrrolidone | Tokyo Chemical Industry | 1.0 | 1.0 | 1.0 | 1.0 | 1.0 |
|  | 3-methyl-1,5-pentanediol |  | 3.0 | 3.0 | 3.0 | 3.0 | 3.0 |
|  | Triethylene glycol |  |  |  |  |  |  |
|  | 1,2-hexanediol | Tokyo Chemical Industry |  |  |  |  |  |
|  | Diethylene glycol monobutyl ether |  | 10.0 |  |  |  |  |
|  | Triethylene glycol monobutyl ether |  |  | 10.0 |  |  |  |
| Pigment | Self-dispersed pigment 1 |  | 6.0 | 6.0 | 6.0 | 6.0 | 6.0 |
|  | Self-dispersed pigment 2 |  |  |  |  |  |  |
|  | Self-dispersed pigment 3 |  |  |  |  |  |  |
|  | Self-dispersed pigment 4 |  |  |  |  |  |  |
|  | Self-dispersed pigment 5 |  |  |  |  |  |  |
|  | Resin-dispersed pigment |  |  |  |  |  |  |
| Surfactant | BYK-348 | BYK Japan | 0.3 | 0.3 | 0.3 |  | 0.3 |
| Neutralizing agent | Triisopropanolamine | Tokyo Chemical Industry | 2.0 | 2.0 | 2.0 | 2.0 | 2.0 |
| Resin particles |  |  | 1.0 | 1.0 | 1.0 | 1.0 | 1.0 |
| Purified water |  |  | Balance | Balance | Balance | Balance | Balance |
| Total |  |  | 100.0 | 100.0 | 100.0 | 100.0 | 100.0 |
| Evaluations | Ejection reliability | Room-temperature continuous ejection stability | C | C | B | B | D B |
|  |  | Intermittent ejection stability | C | C | C | C |  |
|  |  | High-temperature continuous ejection stability | C | C | C | C | C |
|  | Settling characteristics |  | A | A | A | A | A |
|  | Image quality (OD value) |  | A | A | A | A | A |

TABLE 5

|  |  | Manufacturer | Ref. Ex. 1 | Ref. Ex. 2 | Ref. Ex. 3 |
|---|---|---|---|---|---|
| Head b/a |  |  | 4 | 4 | Non-scallop 1 |
| Solvent of general formula (1) | Ethylene glycol |  | 10.0 |  | 10.0 |
|  | Propylene glycol | ADEKA |  |  |  |
|  | 1,4-butanediol | Tokyo Chemical Industry |  |  |  |
|  | 1,5-pentanediol | Tokyo Chemical Industry |  |  |  |
|  | Ethylene glycol monomethyl ether |  |  |  |  |
|  | Propylene glycol monomethyl ether |  |  |  |  |
|  | 1-methoxy butanol | Tokyo Chemical Industry |  |  |  |
|  | Ethylene glycol monoethyl ether | Tokyo Chemical Industry |  |  |  |
|  | Propylene glycol monoethyl ether | Tokyo Chemical Industry |  |  |  |
|  | Diethylene glycol |  |  |  |  |
|  | Diethylene glycol monomethyl ether |  |  |  |  |
|  | Diethylene glycol monoethyl ether | Tokyo Chemical Industry |  |  |  |
|  | Dipropylene glycol | ADEKA |  |  |  |
|  | Dipropylene glycol monomethyl ether |  |  |  |  |
| Monoalcohol solvent | Methano |  |  |  |  |
|  | Ethanol |  |  |  |  |
|  | Propano |  |  |  |  |
| Other solvents | Glycerol | Sakamoto Yakuhin Kogyo | 7.0 | 7.0 | 7.0 |
|  | 2-pyrrolidone | Tokyo Chemical Industry | 1.0 | 1.0 | 1.0 |
|  | 3-methyl-1,5-pentanediol |  | 3.0 | 3.0 | 3.0 |
|  | Triethylene glycol |  |  |  |  |
|  | 1,2-hexanedio | Tokyo Chemical Industry |  |  |  |
|  | Diethylene glycol monobutyl ether |  |  |  |  |
|  | Triethylene glycol monobutyl ether |  |  |  |  |

TABLE 5-continued

| | | | | | |
|---|---|---|---|---|---|
| Pigment | Self-dispersed pigment 1 | | | | 6.0 |
| | Self-dispersed pigment 2 | | | | |
| | Self-dispersed pigment 3 | | | | |
| | Self-dispersed pigment 4 | | | | |
| | Self-dispersed pigment 5 | | | | |
| | Resin-dispersed pigment | | 4.0 | 4.0 | |
| Surfactant | BYK-348 | BYK Japan | 0.3 | 0.3 | 0.3 |
| Neutralizing agent | Triisopropanolamine | Tokyo Chemical Industry | 2.0 | 2.0 | 2.0 |
| Resin particles | | | 1.0 | 1.0 | 1.0 |
| Purified water | | | Balance | Balance | Balance |
| Total | | | 100.0 | 100.0 | 100.0 |
| Evaluations | Ejection reliability | Room-temperature continuous ejection stability | AA | A | AA |
| | | Intermittent ejection stability | A | B | AA |
| | | High-temperature continuous ejection stability | AA | A | AA |
| | Settling characteristics | | A | A | A |
| | Image quality (OD value) | | B | B | A |

| | | Manufacturer | Ref. Ex. 4 | Ref. Ex. 5 | Ref. Ex. 6 |
|---|---|---|---|---|---|
| Head b/a | | | Non-scallop 1 | Non-scallop 2 | Non-scallop 2 |
| Solvent of general formula (1) | Ethylene glycol | | | 10.0 | |
| | Propylene glycol | ADEKA | | | |
| | 1,4-butanediol | Tokyo Chemical Industry | | | |
| | 1,5-pentanediol | Tokyo Chemical Industry | | | |
| | Ethylene glycol monomethyl ether | | | | |
| | Propylene glycol monomethyl ether | | | | |
| | 1-methoxy butanol | Tokyo Chemical Industry | | | |
| | Ethylene glycol monoethyl ether | Tokyo Chemical Industry | | | |
| | Propylene glycol monoethyl ether | Tokyo Chemical Industry | | | |
| | Diethylene glycol | | | | |
| | Diethylene glycol monomethyl ether | | | | |
| | Diethylene glycol monoethyl ether | Tokyo Chemical Industry | | | |
| | Dipropylene glycol | ADEKA | | | |
| | Dipropylene glycol monomethyl ether | | | | |
| Monoalcohol solvent | Methano | | | | |
| | Ethanol | | | | |
| | Propano | | | | |
| Other solvents | Glycerol | Sakamoto Yakuhin Kogyo | 7.0 | 7.0 | 7.0 |
| | 2-pyrrolidone | Tokyo Chemical Industry | 1.0 | 1.0 | 1.0 |
| | 3-methyl-1,5-pentanediol | | 3.0 | 3.0 | 3.0 |
| | Triethylene glycol | | | | |
| | 1,2-hexanedio | Tokyo Chemical Industry | | | |
| | Diethylene glycol monobutyl ether | | | | |
| | Triethylene glycol monobutyl ether | | | | |
| Pigment | Self-dispersed pigment 1 | | 6.0 | 6.0 | 6.0 |
| | Self-dispersed pigment 2 | | | | |
| | Self-dispersed pigment 3 | | | | |
| | Self-dispersed pigment 4 | | | | |
| | Self-dispersed pigment 5 | | | | |
| | Resin-dispersed pigment | | | | |
| Surfactant | BYK-348 | BYK Japan | 0.3 | 0.3 | 0.3 |
| Neutralizing agent | Triisopropanolamine | Tokyo Chemical Industry | 2.0 | 2.0 | 2.0 |
| Resin particles | | | 1.0 | 1.0 | 1.0 |
| Purified water | | | Balance | Balance | Balance |
| Total | | | 100.0 | 100.0 | 100.0 |
| Evaluations | Ejection reliability | Room-temperature continuous ejection stability | AA | AA | AA |
| | | Intermittent ejection stability | A | AA | A |
| | | High-temperature continuous ejection stability | AA | AA | AA |
| | Settling characteristics | | A | A | A |
| | Image quality (OD value) | | A | A | A |

To conduct the evaluation tests described below, a modified ink jet recording apparatus was prepared by modifying a model SC-T7050, manufactured by Seiko Epson Corporation, and an ink jet head including nozzles was mounted to the modified ink jet recording apparatus. The nozzles had a side wall surface having a scalloped shape, in which the ratio (S1/S2) of the scallop width S1 to the notch depth S2 was a value shown in the tables. Note that in the tables, S1/S2 is denoted as "b/a".

The nozzles of the ink jet head were nozzles formed in a nozzle plate, which was a silicon substrate, by performing a multi-step dry etching process on the nozzle plate by using a BOSCH process. The entirety of the side wall of the nozzles had a scalloped shape. The nozzles were formed in one row at the nozzle density described below. A length of the nozzles in a thickness direction of the nozzle plate was 50 μm. An outermost diameter of each of the nozzles on the ejection side was 20 μm.

Note that a different head 1 ("Non-scallop 1" in Table 5) was an ink jet head including nozzles that did not have a scalloped shape. The nozzles were formed by punching holes in a stainless steel nozzle plate. A different head 2 ("Non-scallop 2" in Table 5) was an ink jet head including nozzles that did not have a scalloped shape. The nozzles were formed in a manner similar to that for the different head 1. However, in the different head 2, the diameter of the punched hole was varied within the nozzle, and thus a step of 0.2 μm in a nozzle diameter direction was provided approximately at a center of the side wall of the nozzle in a thickness direction of the nozzle plate.

A cartridge was filled with the aqueous ink jet ink composition. Photographic paper (a model PXMC44R13, manufactured by Seiko Epson Corporation) was used as a recording target medium. An image with a recording resolution of 1200×1200 dpi was printed as a test pattern. The number of nozzles was 300, and the nozzle density was 300 dpi.

Intermittent Recording Test

The aqueous ink jet ink composition was ejected from all the nozzles in a constant-temperature chamber at 35° C. and 20% RH, and a landing position check pattern was recorded. Next, idle running, which is scanning that does not involve ink ejection, was performed for 10 seconds. During that time, flushing was not performed, and a micro-vibration, which is a vibration of such a degree that ink ejection is not caused, was generated during the idle running. Next, the aqueous ink jet ink composition was ejected from all the nozzles, and a landing position check pattern was recorded. Whether or not the ink was ejected from the nozzles and whether or not landing position displacement (dot displacement) occurred were checked, and intermittent ejection stability was evaluated according to the following evaluation criteria.

Evaluation Criteria

AA: There were no misfiring nozzles, and there was no position displacement.

A: There were no misfiring nozzles, and a percentage of nozzles that caused position displacement was not greater than 2%.

B: There were no misfiring nozzles, and a percentage of nozzles that caused position displacement was greater than 2%.

C: There were one or more misfiring nozzles, and there were one or more nozzles that caused position displacement.

High-Temperature Continuous Recording Test

By using the modified ink jet recording apparatus, printing was performed continuously for 7 hours in a constant-temperature chamber at 40° C. and 20% RH. After printing, a check pattern was printed, and an amount of landing position displacement of the nozzle after printing was measured by using a SmartScope ZIP250 (manufactured by OGP Inc.). The landing position of the first nozzle was used as the reference. Based on the measurement results, high-temperature continuous ejection stability was evaluated according to the following evaluation criteria.

Evaluation Criteria

AA: There were no misfiring nozzles, and the landing displacements were not greater than ±20 μm for all the nozzles.

A: There were no misfiring nozzles, the number of nozzles that caused a landing displacement of greater than ±20 μm and not greater than ±50 μm was less than or equal to five, and the landing displacements for all the remaining nozzles were not greater than ±20 μm, with no nozzles that caused a landing displacement of greater than ±50 μm.

B: There were no misfiring nozzles, the number of nozzles that caused a landing displacement of greater than ±20 μm and not greater than ±50 μm was greater than or equal to six, and there were one or more nozzles that caused a landing displacement of greater than ±50 μm.

C: There were one or more misfiring nozzles.

Room-Temperature Continuous Recording Test

By using the modified ink jet recording apparatus, printing was performed continuously for 21 hours in a constant-temperature chamber at 25° C. and 20% RH. After printing, a check pattern was printed, and an amount of landing position displacement of the nozzle after printing was measured by using a SmartScope ZIP250 (manufactured by OGP Inc.). The landing position of the first nozzle was used as the reference. Based on the measurement results, room-temperature continuous ejection stability was evaluated according to the following evaluation criteria.

Evaluation Criteria

AA: There were no misfiring nozzles, and the landing displacements were not greater than ±20 μm for all the nozzles.

A: There were no misfiring nozzles, the number of nozzles that caused a landing displacement of greater than ±20 μm and not greater than ±50 μm was less than or equal to five, and the landing displacements for all the remaining nozzles were not greater than ±20 μm, with no nozzles that caused a landing displacement of greater than ±50 μm.

B: There were no misfiring nozzles, the number of nozzles that caused a landing displacement of greater than ±20 μm and not greater than ±50 μm was greater than or equal to six, and there were one or more nozzles that caused a landing displacement of greater than ±50 μm.

C: There were one or more misfiring nozzles.

Evaluations of Settling

The amount of the aqueous ink jet ink composition was adjusted such that the total mass of a centrifuge tube, a cap, and the aqueous ink composition was 55 g. The aqueous ink composition was placed in the centrifuge tube, which was then capped. The capped centrifuge tube was placed in a centrifuge (a model CR-20B2 and a ROTOR No. 36, manufactured by Hitachi Koki Co., Ltd.), and the process was performed at a rotational speed of 10000 rpm for 15 minutes. Thereafter, the supernatant (a region of 5 g from the gas-liquid interface) was collected. Absorbances for 500-nm wavelength light of the supernatant and the aqueous ink jet ink composition prior to centrifugation were measured. The ratio of the absorbance of the supernatant to the absorbance of the aqueous ink jet ink composition was calculated, and settling characteristics were evaluated according to the following evaluation criteria. Note that there is a positive correlation between the absorbance and the supernatant concentration.

Evaluation Criteria

AA: The supernatant concentration was greater than or equal to 90% of the initial concentration.

A: The supernatant concentration was 85% or greater and less than 90% of the initial concentration.

B: The supernatant concentration was 80% or greater and less than 85% of the initial concentration.

C: The supernatant concentration was less than 80% of the initial concentration.

OD Value

Photographic paper (a product of Seiko Epson Corporation) was used as a recording target medium for recording. The ink deposition amount was 11 mg/inch$^2$. The recorded portion was dried, and thereafter the reflection density value (OD value) was measured by using a spectrophotometer (Spectrolino (trade name), which is a product of Gretag-Macbeth Inc.). Based on the measured values, the OD value was evaluated according to the following evaluation criteria.

Evaluation Criteria

AA: The OD value was greater than or equal to 2.8.

A: The OD value was 2.5 or greater and less than 2.8.

B: The OD value was 2.2 or greater and less than 2.5.

C: The OD value was 2.0 or greater and less than 2.2.

Discussion

All of the Examples, in which the ink included a self-dispersed pigment and, as a solvent, a compound represented by formula (1), and the nozzles through which the ink was ejected satisfied the relationship of S1/S2≥4, exhibited excellent ejection reliability. In contrast, all of the Comparative Examples, which lacked one or more of these characteristics, exhibited degraded ejection reliability. More details are described below. The results of Examples 1, 30, and 31 and Comparative Examples 1 and 2 demonstrate that in a case in which the S1/S2 value was greater, higher nozzle ejection reliability was achieved. The results of Examples 1, 17 to 19 and Examples 11 and 21 to 23 demonstrate that in cases in which a monoalcohol was included in the aqueous ink jet ink composition, better room-temperature continuous ejection stability was achieved. The results of Examples 19 and 20 demonstrate that in a case in which the content of a monoalcohol was increased, better room-temperature continuous ejection stability was achieved. The results of Examples 1, 26, and 27 demonstrate that in a case in which the specific surface area of the self-dispersed pigment was increased, settling was further inhibited, and in a case in which the specific surface area of the self-dispersed pigment was reduced, better color development was achieved. The results of Examples 1, 24, and 25 demonstrate that in a case in which the volume average particle diameter of the self-dispersed pigment was increased, higher ejection reliability and color development were achieved, and in a case in which the volume average particle diameter of the self-dispersed pigment was reduced, settling was further inhibited. The results of Examples 1, 28, and 29 demonstrate that in a case in which the content of the self-dispersed pigment was increased, better color development was achieved, and in a case in which the content of the self-dispersed pigment was reduced, higher ejection reliability was achieved. The results of Examples 1, 15, and 16 demonstrate that in a case in which the content of a compound represented by equation (1) was increased, excellent intermittent ejection stability and high-temperature continuous ejection stability were achieved. The results of Examples 1 to 14 demonstrate that in cases in which the molecular weight of the compound represented by formula (1) was 50 or greater and 150 or less, excellent ejection reliability, non-settling characteristics, and color development were all achieved. A comparison between Examples 4, 5, 8, and 9 demonstrates that in a case in which $R_1$ in formula (1) was a hydrogen atom, better room-temperature continuous ejection stability, intermittent ejection stability, non-settling characteristics, and color development were all achieved. Comparisons between Examples 13, 14, and 16 and between Examples 7 to 11 demonstrate that in cases in which $R_2$ in the compound represented by formula (1) was a divalent saturated hydrocarbon having 5 or fewer carbon atoms, higher ejection reliability was achieved. The results of Examples 1, 2, 6, 8, 10, and 13 demonstrate that in cases in which the compound represented by formula (1) was ethylene glycol, diethylene glycol, propylene glycol, dipropylene glycol, propylene glycol monomethyl ether, or ethylene glycol monomethyl ether, excellent room-temperature continuous ejection stability, intermittent ejection stability, non-settling characteristics, and color development were all achieved. In particular, in cases in which ethylene glycol or diethylene glycol was used, excellent results were obtained. In Comparative Examples 3 to 10, the ink did not include the compound represented by formula (1), and, therefore, ejection reliability was degraded. In Comparative Examples 1 and 2, the S1/S2 value of the nozzles was less than 4, and, therefore, ejection reliability was degraded. Reference Examples 1 and 2 are examples in which the pigment included in the ink was not a self-dispersed pigment but a pigment dispersed with a resin dispersing agent. With such a pigment, increasing the pigment content in the ink tends to result in a high viscosity of the ink; therefore, in Reference Examples 1 and 2, the pigment content was somewhat reduced, and as a result, the OD value was low. In Comparative Example 2, the ink did not include the compound represented by formula (1), but ejection reliability was not degraded. This indicates that in a case in which a self-dispersed pigment is included in an ink, the compound represented by formula (1) is necessary for achieving excellent ejection reliability. Reference Examples 3 to 6 are examples in which the ink jet head used was not provided with nozzles having a scalloped shape. Since such an ink jet head was used, low-cost production of an ink jet head having a high nozzle density was not realized in Reference Examples 3 to 6. In Comparative Examples 4 and 6, the ink did not include the compound represented by formula (1), but ejection reliability was not degraded. This indicates that in a case in which ink is to be ejected from an ink jet head including nozzles that have a scalloped shape, the compound represented by formula (1) is necessary for achieving excellent ejection reliability.

What is claimed is:

1. An aqueous ink jet ink composition, which is an aqueous ink jet ink composition for use in an ink jet recording method that includes ejecting ink from an ink jet head, the ink jet head including nozzles that have a side wall surface, the side wall surface having a scalloped shape in which a scallop width S1 and a notch depth S2 satisfy S1/S2≥4, the aqueous ink jet ink composition comprising:

resin particles in an amount that ranges between 0.2 to 5 mass % relative to a total mass of the aqueous ink jet ink composition;

a self-dispersed pigment;

a monoalcohol in an amount that ranges between 2 mass % or greater and 10 mass % or less relative to the total mass of the aqueous ink jet ink composition;

an agent selected from the group consisting of N,N-dimethylethanolamine, N,N-diethylethanolamine, triisopropanolamine, trimethylamine, triethylamine, sodium hydroxide, potassium hydroxide, and ammonia; and a solvent that includes a compound represented by formula (1) below,

$$R_1\text{—}O\text{—}R_2\text{—}OH \qquad (1)$$

where $R_1$ represents a hydrogen atom, a methyl group, or an ethyl group, and $R_2$ represents a divalent saturated hydrocarbon group having 5 or fewer carbon atoms or represents a group represented by formula (2) below,

$$R_3\text{—}O\text{—}R_4 \qquad (2)$$

where $R_3$ and $R_4$ each independently represent a divalent saturated hydrocarbon group having 2 or 3 carbon atoms.

2. The aqueous ink jet ink composition according to claim 1, wherein the monoalcohol includes at least one of methanol, ethanol, n-propyl alcohol, isopropyl alcohol, n-butanol, 2-butanol, tert-butanol, isobutanol, n-pentanol, 2-pentanol, 3-pentanol, and tert-pentanol.

3. The aqueous ink jet ink composition according to claim 2, wherein a content of the monoalcohol is 2 mass % or greater and 6 mass % or less relative to a total mass of the aqueous ink jet ink composition.

4. The aqueous ink jet ink composition according to claim 1, wherein a specific surface area of the self-dispersed pigment as measured by pulsed NMR is less than or equal to 60 m²/g.

5. The aqueous ink jet ink composition according to claim 1, wherein a volume average particle diameter of the self-dispersed pigment is 90 nm or greater and 150 nm or less.

6. The aqueous ink jet ink composition according to claim 1, wherein a content of the self-dispersed pigment is 4 mass % or greater and 8 mass % or less relative to a total mass of the aqueous ink jet ink composition.

7. The aqueous ink jet ink composition according to claim 1, wherein the self-dispersed pigment includes carbon black.

8. The aqueous ink jet ink composition according to claim 1, wherein a content of the compound represented by formula (1) is 2 mass % or greater and 16 mass % or less relative to a total mass of the aqueous ink jet ink composition.

9. The aqueous ink jet ink composition according to claim 1, wherein a molecular weight of the compound represented by formula (1) is 50 or greater and 150 or less.

10. The aqueous ink jet ink composition according to claim 1, wherein $R_1$ in formula (1) is a hydrogen atom.

11. The aqueous ink jet ink composition according to claim 1, wherein the compound represented by formula (1) is at least one selected from the group consisting of ethylene glycol, diethylene glycol, propylene glycol, dipropylene glycol, propylene glycol monomethyl ether, and ethylene glycol monomethyl ether.

12. The aqueous ink jet ink composition according to claim 1, wherein the nozzles are nozzles formed by performing an etching process and an etching side wall protection process alternately and repeatedly several times.

13. An ink jet recording method comprising an ejection step of ejecting the aqueous ink jet ink composition according to claim 1 from an ink jet head, the ink jet head including nozzles that have a side wall surface, the side wall surface having a scalloped shape in which a scallop width S1 and a notch depth S2 satisfy S1/S2≥4.

14. The aqueous ink jet ink composition according to claim 1, wherein the resin particles include at least one of acrylic-based resin particles and urethane-based resin particles.

15. The aqueous ink jet ink composition according to claim 1, wherein the amount of resin particles ranges between 0.2 to 3 mass % relative to the total mass of the aqueous ink jet ink composition.

* * * * *